(12) United States Patent
Fujino et al.

(10) Patent No.: US 7,214,646 B1
(45) Date of Patent: May 8, 2007

(54) METHOD FOR PRODUCING ACTIVATED CARBON FOR ELECTRODE OF ELECTRIC DOUBLE-LAYER CAPACITOR

(75) Inventors: Takeshi Fujino, Wako (JP); Shigeki Oyama, Wako (JP); Naohiko Oki, Wako (JP); Minoru Noguchi, Wako (JP); Kenji Sato, Wako (JP); Shushi Nishimura, Bizen (JP); Takashi Maeda, Kashima-gun (JP); Yuji Kawabuchi, Kashima-gun (JP); Takahiro Haga, Kashima-gun (JP)

(73) Assignees: Honda Giken Kogyo Kabushiki Kaisha, Tokyo (JP); Kuraray Chemical Co., Ltd., Okayama (JP); Kashima Oil Co., Ltd., Tokyo (JP)

( * ) Notice: Subject to any disclaimer, the term of this patent is extended or adjusted under 35 U.S.C. 154(b) by 572 days.

(21) Appl. No.: 10/048,470

(22) PCT Filed: Aug. 9, 2000

(86) PCT No.: PCT/JP00/05340

§ 371 (c)(1),
(2), (4) Date: Jun. 7, 2002

(87) PCT Pub. No.: WO01/13390

PCT Pub. Date: Feb. 22, 2001

(30) Foreign Application Priority Data

| Aug. 10, 1999 | (JP) | ................................ 11-226719 |
| Jan. 28, 2000 | (JP) | ............................ 2000-024815 |
| Jun. 29, 2000 | (JP) | ............................ 2000-195922 |
| Aug. 2, 2000 | (JP) | ............................ 2000-234674 |

(51) Int. Cl.
*C01B 31/08* (2006.01)
(52) U.S. Cl. ..................................... 502/417; 502/427
(58) Field of Classification Search ................. 502/427, 502/417; 429/231.8
See application file for complete search history.

(56) References Cited

U.S. PATENT DOCUMENTS

| 4,769,359 A | * | 9/1988 | Audley et al. ............... 502/427 |
| 5,488,023 A | * | 1/1996 | Gadkaree et al. ............ 502/182 |
| 6,022,518 A | * | 2/2000 | Yamazaki et al. ........... 423/448 |
| 6,118,650 A | * | 9/2000 | Maeda et al. ................ 361/508 |
| 6,291,069 B1 | * | 9/2001 | Noguchi et al. .............. 428/408 |

FOREIGN PATENT DOCUMENTS

| JP | 1-139865 | 6/1989 |
| JP | 2-185008 | 7/1990 |
| JP | 5-247731 | 9/1993 |
| JP | 7-302735 | 11/1995 |
| JP | 8-119614 | 5/1996 |
| JP | 10-121336 | 5/1998 |
| JP | 10-172870 | 6/1998 |
| JP | 10-335189 | 12/1998 |
| JP | 11-135380 | 5/1999 |
| JP | 11-222732 | 8/1999 |
| JP | 2000-138140 | 5/2000 |
| JP | 2000-203962 | 7/2000 |
| JP | 2000-277390 | 10/2000 |

\* cited by examiner

*Primary Examiner*—Stuart Hendrickson
(74) *Attorney, Agent, or Firm*—Arent Fox LLP

(57) ABSTRACT

To produce activated carbon for an electrode of an electric double-layer capacitor, the following steps are carried out sequentially: a step of subjecting a massive mesophase pitch to a pulverizing treatment to provide a pulverized powder; a step of subjecting the pulverized powder to an infusibilizing treatment under conditions of a temperature in a range of 300° C. (inclusive) to 450° C. (inclusive) in the atmospheric air current, a step of subjecting the pulverized powder to a carbonizing treatment under conditions of a temperature in a range of 600° C. (inclusive) to 900° C. (inclusive) in an inert gas current to provide a carbonized powder, a step of subjecting the carbonized powder to an alkali activating treatment under conditions of a temperature in a range of 500° C. (inclusive) to 1,000° C. (inclusive) in an inert gas atmosphere, followed by the post treatments, thereby producing alkali-activated carbon, and a step of subjecting the alkali-activated carbon to a pulverizing treatment. If an electrode is produced using the activated carbon, the electrode density can be increased.

3 Claims, 20 Drawing Sheets

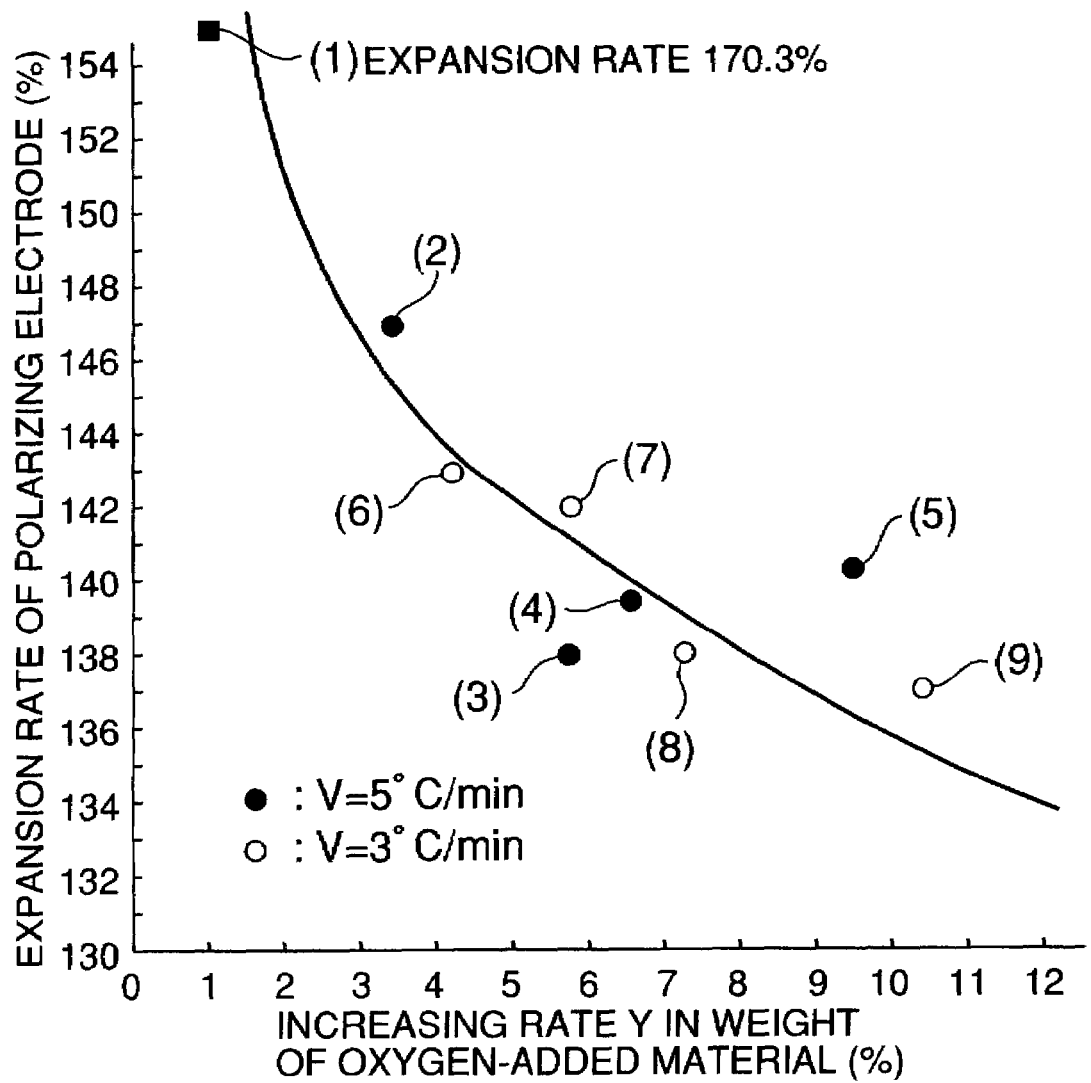

METHOD FOR PRODUCING ACTIVATED CARBON FOR ELECTRODE OF ELECTRIC DOUBLE-LAYER CAPACITOR

FIELD OF THE INVENTION

The present invention relates to a process for producing activated carbon for an electrode of an electric double-layer capacitor.

BACKGROUND ART

Such a conventionally known type of activated carbon for an electrode includes alkali-activated carbon, which is a carbonized powder made using a graphitizable carbon powder, e.g., mesophase pitch as a starting material, aiming at the increase of the electrostatic capacity.

This alkali-activated carbon is produced by a process comprising a step of producing a fibrous material by spinning using mesophase pitch, a step of subjecting the fibrous material to an infusibilizing treatment and then to a carbonizing treatment, a step of subjecting the carbonized material to an alkali activating treatment and then to a pulverizing treatment, or to a pulverizing treatment and then to an alkali activating treatment.

The alkali-activated carbon made in the conventional process, however, suffers from the following problem: The alkali-activated carbon is an activated carbon powder made by pulverizing the fibrous material and hence, even if the length of particles of the powder is shortened due to the pulverization, the longitudinal breaking of the particles, namely, the breaking such as to break end faces of the fiber is hard to occur, and the over-pulverization brings about the degradation of the performance. Thus, the alkali-activated carbon contains a large number of columnar particles. If an electrode is produced using such alkali-activated carbon, the columnar particles are dispersed at random, whereby gaps are liable to be created between the columnar particles. As a result, an electrode density (g/cc) is low and it is impossible to increase the electrostatic capacity density (F/cc) of an electric double-layer capacitor.

If the alkali acting treatment is utilized, it is possible to produce activated carbon for an electrode, which has relatively uniform pores made therein and a high electrostatic capacity density. However, the activated carbon for the electrode having the pores made by the alkali activation with such an electrostatic capacity density being largely taken into account is accompanied by a problem that it is difficult to ensure a pore diameter sufficient for the diffusion of a liquid electrolyte and ions, and an electric double-layer capacitor produced using the activated carbon and the like has an increased internal resistance due to the foregoing.

Further, if a polarizing electrode is formed using the activated carbon for an electrode produced in the conventional process, the amount of polarizing electrode expanded during charging is large. For this reason, for example, in a laminated-type or rolled-type electric double-layer capacitor, it is necessary to take a measure for providing a space corresponding to the amount of polarizing electrode expanded within a case, or a measure for increasing the strength of the case to receive a force of expansion of the polarizing electrode. However, the former brings about a disadvantage of a decrease in electrostatic capacity per unit volume, and the latter brings about disadvantages of an increase in cost of the case, an increase in weight of the case and the like.

DISCLOSURE OF THE INVENTION

Accordingly, it is an object of the present invention to provide a producing process of the above-described type capable of producing alkali-activated carbon, by employing a particular measure, from which an electrode having an increased density can be produced.

To achieve the above object, according to the present invention, there is provided a process for producing activated carbon for an electrode of an electric double-layer capacitor, comprising a step of subjecting a massive mesophase pitch to a pulverizing treatment to provide a pulverized powder, a step of subjecting the pulverized powder to an infusibilizing treatment under conditions of a temperature in a range of 300° C. (inclusive) to 450° C. (inclusive) in the atmospheric air current, a step of subjecting the pulverized powder to a carbonizing treatment under conditions of a temperature in a range of 600° C. (inclusive) to 900° C. (inclusive) in an inert gas current to provide a carbonized powder, a step of subjecting the carbonized powder to an alkali activating treatment under conditions of a temperature in a range of 500° C. (inclusive) to 1,000° C. (inclusive) in an inert gas atmosphere, followed by the post treatments, thereby producing alkali-activated carbon, and a step of subjecting the alkali-activated carbon to a pulverizing treatment, wherein the above steps are carried out in the mentioned order.

The alkali-activated carbon produced by the above-described process comprises fine massive particles, because the powder resulting from the pulverization of the massive mesophase pitch is used as a starting material. Therefore, fine massive particles in an electrode made using the alkali-activated carbon present a structure near the closest filled structure and hence, the electrode density can be enhanced largely.

If the temperature in the infusibilizing treatment is lower than 300° C., the infusibilization is insufficient and for this reason, the pulverized powder is molten in the subsequent carbonizing treatment. On the other hand, if the temperature in the infusibilizing treatment exceeds 450° C., the oxidization advances excessively and hence, the temperature exceeding 450° C. is not preferred. If the temperature in the carbonizing treatment is lower than 600° C., the density of the alkali-activated carbon produced in the subsequent step is decreased. On the other hand, if the temperature in the carbonizing treatment exceeds 900° C., the activation of the carbonized powder is very hard to advance. Further, if the temperature in the alkali activating treatment is lower than 500° C., the activation is hard to advance. On the other hand, if the temperature in the alkali activating treatment exceeds 1,000° C., the activation advances excessively, resulting in a decreased density of the resulting alkali-activated carbon and a reduced yield of the alkali-activated carbon.

It is another object of the present invention to provide a producing process of the above-described type, capable of producing activated carbon for an electrode, which has a pore diameter facilitating the diffusion of a liquid electrolyte and ions, and an electrostatic capacity density as hitherto.

To achieve the above object, according to the present invention, there is provided a process for producing activating carbon for an electrode of an electric double-layer capacitor, comprising a step of subjecting a starting material for activated carbon and containing a metal compound incorporated therein to a carbonizing treatment and a subsequent activating treatment.

If the above-described means is employed, the metal compound is decomposed and gasified in the carbonizing treatment to produce a gas, and fine pores are formed by the gas. In the activating treatment, the fine pores serves as a source, and the metal serves as an assistant or a catalyst to promote the formation of the pores. Therefore, the diameter of the pores in the activated carbon for the electrode is enlarged. In addition, the conductivity of the activated carbon itself for the electrode is enhanced by the incorporation of the metal. Thus, the internal resistance of an electric double-layer capacitor produced can be reduced. On the other hand, if the enlargement of the pore diameter is to this extent, the electrostatic capacity density of the activated carbon for the electrode is not varied and hence, the activated carbon has the electrostatic capacity density as hitherto.

It is a further object of the present invention to provide a producing process of the above-described type capable of producing activated carbon for an electrode, wherein when a polarizing electrode is produced from the activated carbon, the amount of polarizing electrode expanded during charging can be decreased.

To achieve the above object, according to the present invention, there is provided a process for producing activated carbon for an electrode of an electric double-layer capacitor, comprising a step of subjecting a graphitizable carbon powder to an alkali activating treatment to produce activated carbon for an electrode of an electric double-layer capacitor, a mixed activating agent comprising KOH and NaOH being used as an alkali activating agent.

It can be considered that NaOH in the mixed activating agent exhibits a function to decrease the diameters of pores in the activated carbon and reduce the distance between carbon crystallites to strengthen the cross-linking of —C—O—C— (therefore, reduce the decomposition of the crosslinkage). Thus, it is possible to reduce the amount of polarizing electrode expanded during charging, as compared with a case where only KOH is employed.

According to the present invention, there is also provided a process for producing activated carbon for an electrode of an electric double-layer capacitor, comprising a step of subjecting a starting material for activated carbon, which is an aggregate of solids, to an oxygen-adding treatment to provide an oxygen-added material with oxygen dispersed in all the solids, a step of subjecting the oxygen-added material to a carbonizing treatment to provide a carbonized material, and a step of subjecting the carbonized material to an activating treatment to produce activated carbon.

If the oxygen-adding treatment as described above is carried out, when a polarizing electrode is formed using the activated carbon produced through the subsequent carbonizing and activating treatments, the amount of polarizing electrode expanded during charging can be reduced.

BRIEF DESCRIPTION OF THE DRAWINGS

FIG. 20 is a graph showing the relationship between the rate of increase in weight of an oxygen-added material and the expansion rate of a polarizing electrode.

BEST MODE FOR CARRYING OUT THE INVENTION

Embodiment-I

Figure 1:
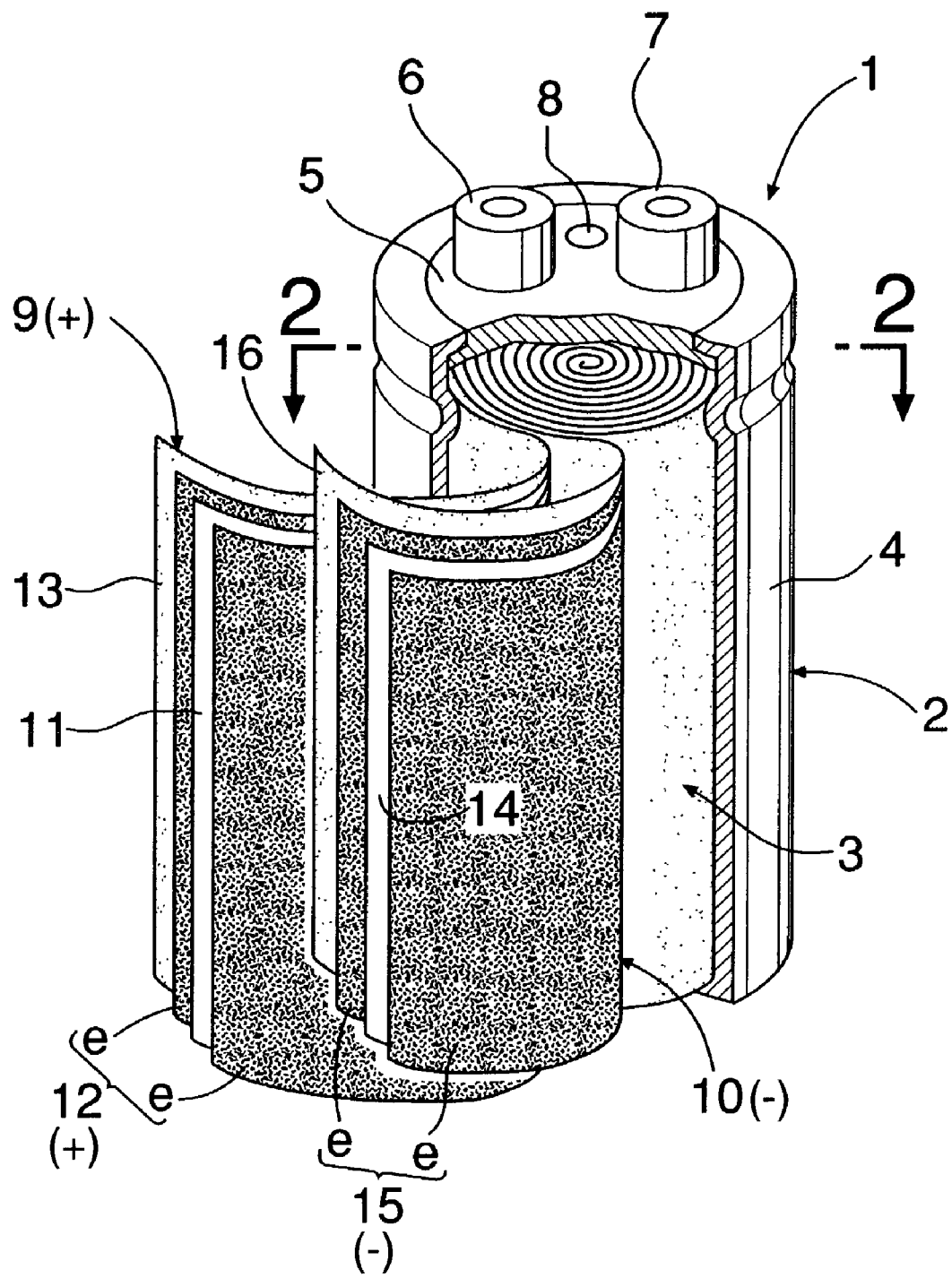
FIG. 1 is a broken-away perspective view of an essential portion of a cylindrical electric double-layer capacitor.
Figure 2:
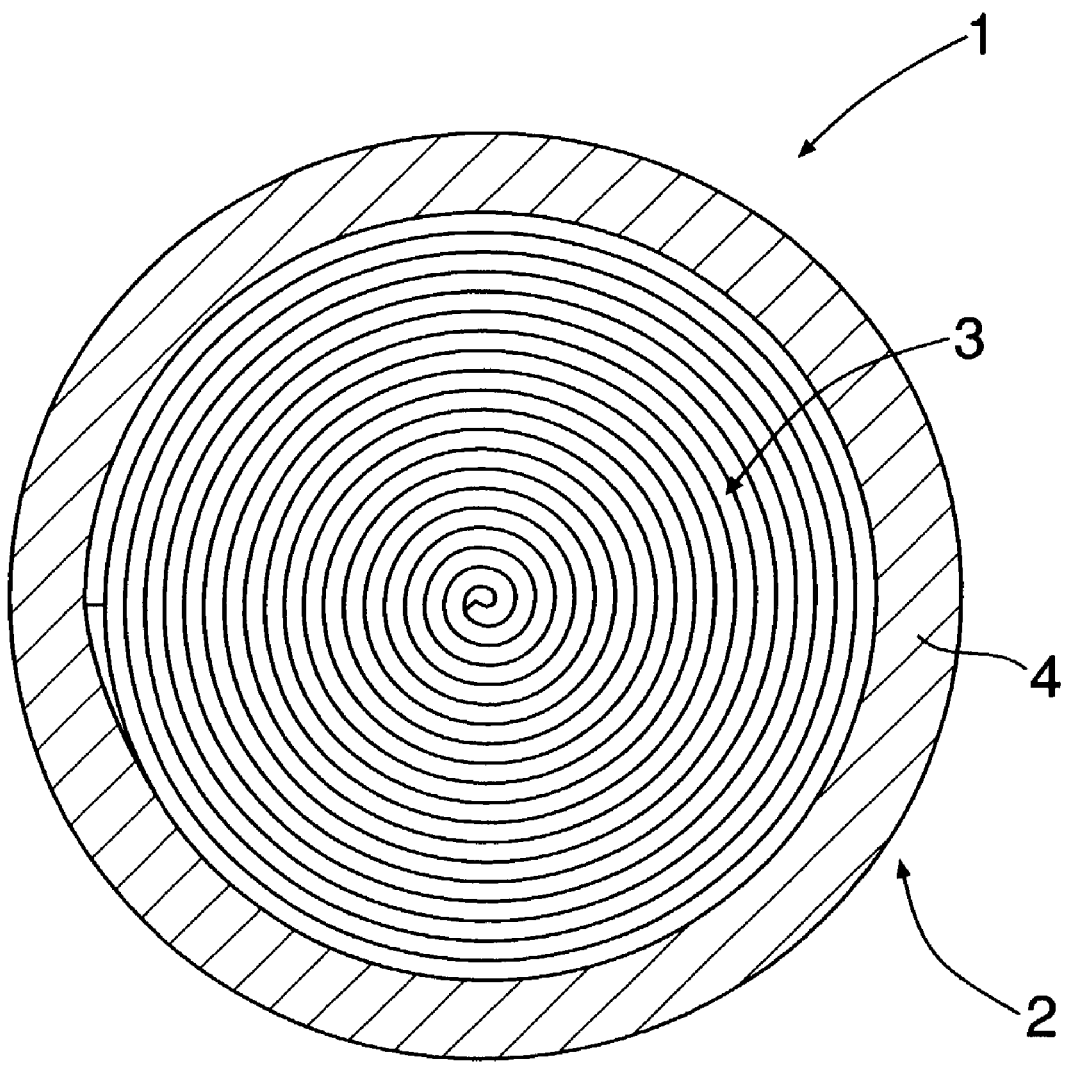
FIG. 2 is a sectional view taken along a line 2—2 in FIG. 1.

Referring to FIGS. 1 and 2, a cylindrical electric double-layer capacitor 1 comprises a vessel 2 made of aluminum, an electrode roll 3 accommodated in the vessel 2, and a liquid electrolyte poured into the vessel 2. The vessel 2 comprises a bottomed cylindrical body 4, and a terminal plate 5 which closes an opening in one end of the cylindrical body 4. The terminal plate 5 is provided with positive and negative terminals 6 and 7 and a safety valve 8.

The electrode roll 3 includes a positive-pole laminated band 9 and a negative-pole laminated band 10. The positive-polar laminated band 9 comprises a band-shaped collector 11 formed of an aluminum foil, band-shaped polarizing electrodes e adhered to opposite sides of the band-shaped collector 11 with a conductive adhesive, respectively, and a first separator 13 made of PTFE (polytetrafluoroethylene) and superposed on one of the band-shaped polarizing electrodes e. A band-shaped positive pole 12 is formed by the pair of the polarizing electrodes e. The liquid electrolyte is retained in an impregnated manner in the first separator 13. The negative-polar laminated band 10 comprises a band-shaped collector 14 formed of an aluminum foil, band-shaped polarizing electrodes e adhered to opposite sides of the band-shaped collector 14 with a conductive adhesive, respectively, and a second separator 16 made of PTFE and superposed on one of the band-shaped polarizable electrodes e. A band-shaped negative pole 15 is formed by the pair of the polarizable electrodes e. The liquid electrolyte is retained in an impregnated manner in the second separator 16.

To produce the electrode roll 3, the second separator 16 of the negative-polar laminated band 10 is superposed onto the exposed polarizing electrode e of the positive-polar laminated band 9. This superposed assembly is wound spirally, so that the first separator 13 of the positive-polar laminated band 9 is located on the outermost side.

One example of the liquid electrolyte, which may be used, is a solution of a quaternary ammonium borofluoride compound, e.g., $TEMA.BF_4[(C_2H_5)_3CH_3N.BF_4$ (triethylmethyl ammonium borofluoride), (a solute)] in PC (propylene carbonate, a solvent).

Alkali-activated carbon made from mesophase pitch used as a starting material is used as activated carbon for the electrode. The alkali-activated carbon is produced in the following manner:

The alkali-activated carbon is produced through a step of subjecting massive mesophase pitch to a pulverizing treatment to produce a pulverized powder, a step of subjecting the pulverized powder to an infusibilizing treatment under conditions of a temperature in a range of 300° C. (inclusive) to 450° C. (inclusive) in the atmospheric air current, a step of subjecting the pulverized powder to a carbonizing treatment under conditions of a temperature in a range of 600° C. (inclusive) to 900° C. (inclusive) in an inert gas current to provide a carbonized powder, a step of subjecting the carbonized powder to an alkali activating treatment under conditions of a temperature in a range of 500° C. (inclusive) to 1,000° C. (inclusive) in an inert gas atmosphere, followed by the post treatments, thereby producing alkali-activated carbon, and a step of subjecting the alkali-activated carbon to a pulverizing treatment.

It is desirable that the treating time be equal to or longer than 0.5 hour and equal to or shorter than 10 hours in any of the infusibilizing treatment, the carbonizing treatment and the alkali activating treatment. If the treating time is shorter than the lower limit value in any of the treatments, an intended object cannot be achieved. On the other hand, if the treating time exceeds the upper limit value, there is a possibility that the characteristics of the treated material are detracted.

The alkali-activated carbon provided by the above process is made using the powder resulting from the pulverization of the massive mesophase pitch as a starting material and hence, comprises fine massive particles. Therefore, in the band-shaped positive and negative poles 12 and 15, the fine massive particles present a structure near the closest filled structure and hence, the electrode density can be enhanced largely.

Particular examples will be described below.

EXAMPLE-1

First, alkali-activated carbon using a starting material of mesophase pitch, i.e., KOH-activated carbon in Example-1 was produced in the following manner:

(a) Massive mesophase pitch was subjected to a pulverizing treatment at room temperature to produce a pulverized powder having an average particle size of 300 μm. Then, the powder was subjected to an infusibilizing treatment at 350° C. for 2 hours in the atmospheric air current and then to a carbonizing treatment at 700° C. for 1 hour in the current of nitrogen gas to provide a carbonized powder. (b) The carbonized powder and an amount of KOH two times the weight of carbon in the powder were mixed together, and the resulting mixture was subjected to a potassium activating treatment as an alkali activating treatment at 800° C. for 5 hours in the nitrogen atmosphere, followed by the post treatments such as the neutralization by hydrochloric acid, washing and drying, thereby providing KOH-activated carbon as activated carbon. (c) The KOH-activated carbon was subjected to a pulverizing treatment using a jet mill to produce fine KOH-activated carbon having a predetermined average particle size. This fine KOH-activated carbon is called simply KOH-activated carbon.

The KOH-activated carbon having the predetermined average particle size, a graphite powder (a conductive filler) and PTFE (a binder) were weighed, so that a weight ratio of 85:12.5:2.5 was obtained. Then, the weighed materials were kneaded together and then subjected to a rolling to fabricate an electrode sheet having a thickness of 175 μm. A plurality of band-shaped polarizing electrodes e each having a width of 95 mm and a length of 1,500 mm were cut from the electrode sheet. Then, a positive-polar laminated band 9 was fabricated using the two band-shaped polarizing electrodes e, a band-shaped collector 11 having a width of 105 mm, a length of 1,500 mm, a thickness of 40 μm and a conductive adhesive and a first separator 13 made of PTFE and having a thickness of 75 μm. Further, a negative-polar laminated band 10 was fabricated using the two similar band-shaped polarizing electrodes e, a band-shaped collector 14, a conductive adhesive and a second separator 16 having a thickness of 75 μm.

Then, the second separator 16 of the negative-polar laminated band 10 was superposed onto the exposed band-shaped polarizing electrode e of the positive-polar laminated band 9, and the resulting superposed assembly was rolled spirally, so that the first separator 13 of the positive-polar laminated band 9 was located on the outermost side, thereby producing an electrode roll 3. This electrode roll 3 and a liquid electrolyte comprising 1.5 moles of $TEMA.BF_4$ dissolved in a solution of PC were placed into a bottomed cylindrical body 4 of a vessel 2 having an inside diameter of 50 mm and a length of 130 mm, and an opening in the bottomed cylindrical body 4 was closed using a terminal plate 5 to provide a cylindrical electric double-layer capacitor 1. In the closing of the opening, the collectors 11 of the positive-pole laminated band 9 and the negative-polar laminated band 10 were connected to the positive terminal 6 and the negative terminal 7 of the terminal plate 5, respectively. Further, four cylindrical electric double-layer capacitors 1 were produced in the same manner as that described above. These capacitors 1 are called examples (1) to (5).

EXAMPLE-II

For comparison, a fiber-shaped material having an average diameter of 10 μm was produced by subjecting mesophase pitch to a spinning and then subjected sequentially to an infusibilizing treatment, a carbonizing treatment, an alkali activating treatment and a pulverizing treatment under the same conditions as in Example-I to provide KOH-activated carbon having a predetermined average particle size.

Then, five cylindrical electric double-layer capacitors 1 were produced in the same manner as in Example-I. These capacitors 1 are called examples (6) to (10).

[Performance of Electric Double-Layer Capacitor]

Table 1 shows the average particle size of the KOH-activated carbon, the electrode density of the band-shaped positive and negative poles 12 and 15 and thus polarizing electrode e, and the electrostatic capacity density (F/cc) for the examples (1) to (10) of the electric double-layer capacitors 1. The average particle size of the KOH-activated carbon was measured using a particle size distribution-measuring device, and the charging was carried out at 2.5 V in an atmosphere of 45° C.

TABLE 1

| Electric double-layer capacitor | Average particle size (μm) | Electrode density (g/cc) | Electrostatic capacity density (F/cc) |
|---|---|---|---|
| Example (1) | 2.36 | 0.924 | 33.6 |
| Example (2) | 8.64 | 0.987 | 36.0 |
| Example (3) | 9.8 | 0.983 | 35.7 |
| Example (4) | 13.23 | 0.956 | 34.8 |
| Example (5) | 26.28 | 0.913 | 33.0 |
| Example (6) | 1.03 | 0.832 | 29.9 |
| Example (7) | 7.67 | 0.865 | 31.1 |
| Example (8) | 9.7 | 0.863 | 31.4 |
| Example (9) | 14.45 | 0.845 | 30.7 |
| Example (10) | 28 | 0.779 | 28.4 |

Figure 3:
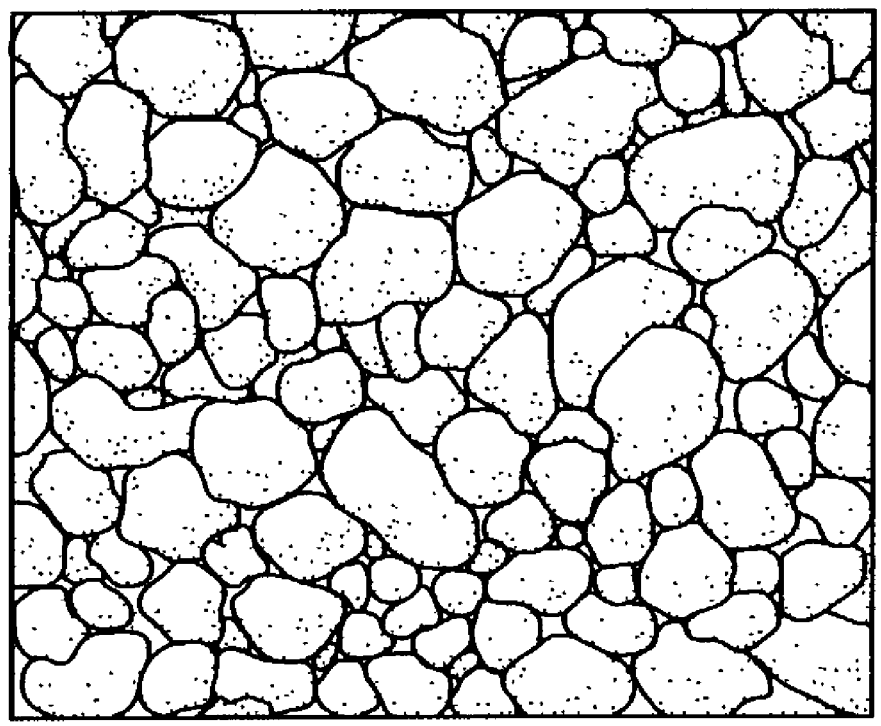
FIG. 3 is a diagram showing a microscopic structure of a surface of one example of a polarizing electrode.

FIG. 3 shows a photomicrograph of a surface of the polarizing electrode e in example (2). It can be seen from FIG. 3 that fine massive particles present a structure near the closest filled structure.

Figure 4:
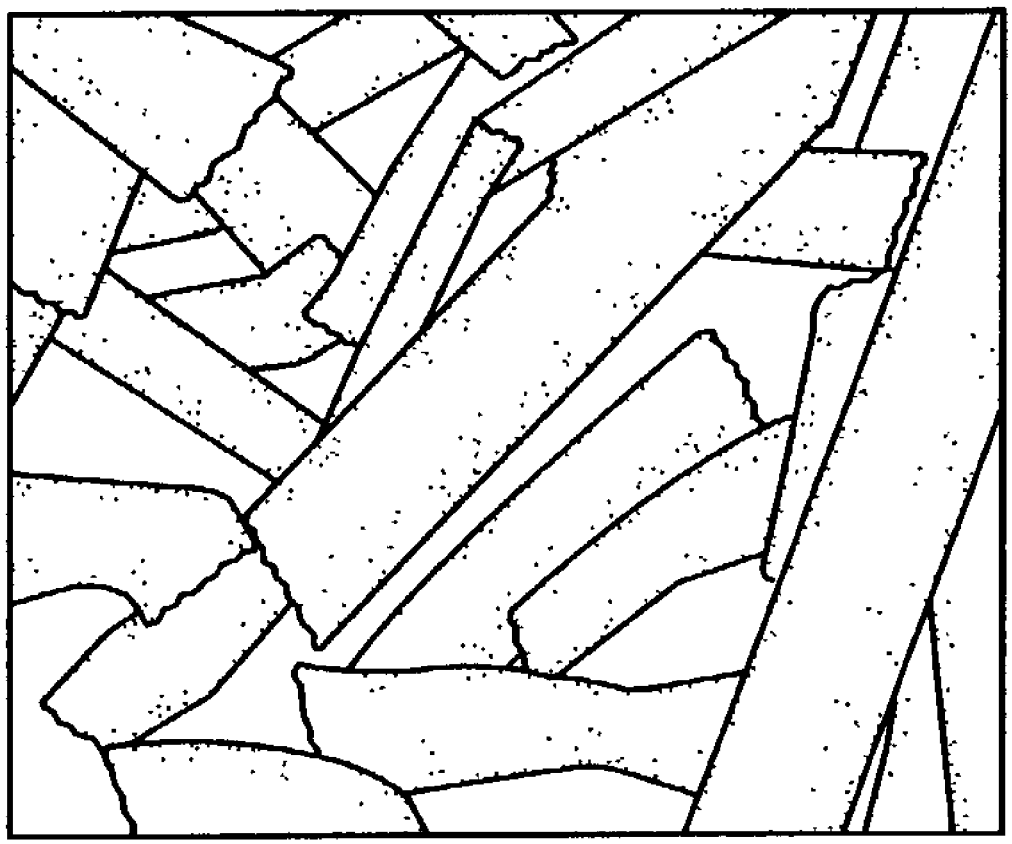
FIG. 4 is a diagram showing a microscopic structure of a surface of another example of a polarizing electrode.

FIG. 4 shows a photomicrograph of a surface of the polarizing electrode e in example (7). It can be seen from FIG. 4 that columnar particles are dispersed at random to create gaps between them.

Figure 5:
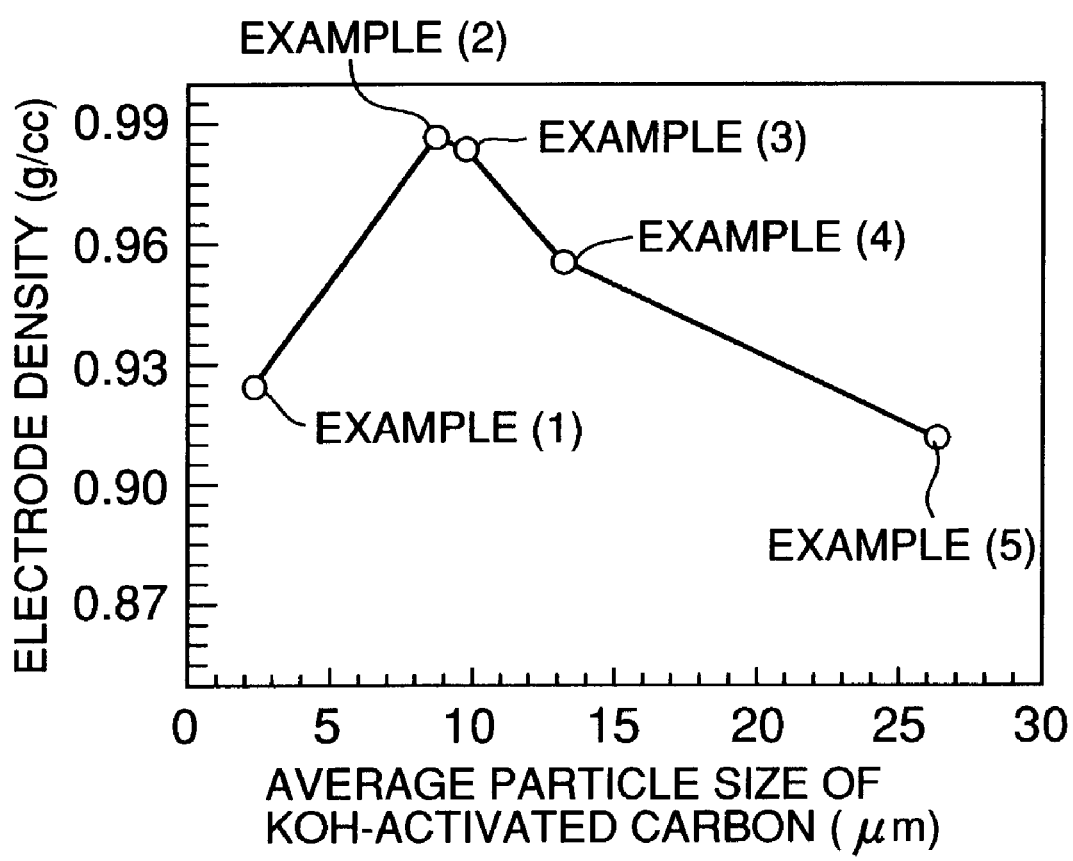
FIG. 5 is a graph showing one example of the relationship between the average particle size of KOH-activated carbon and the electrode density.
Figure 6:
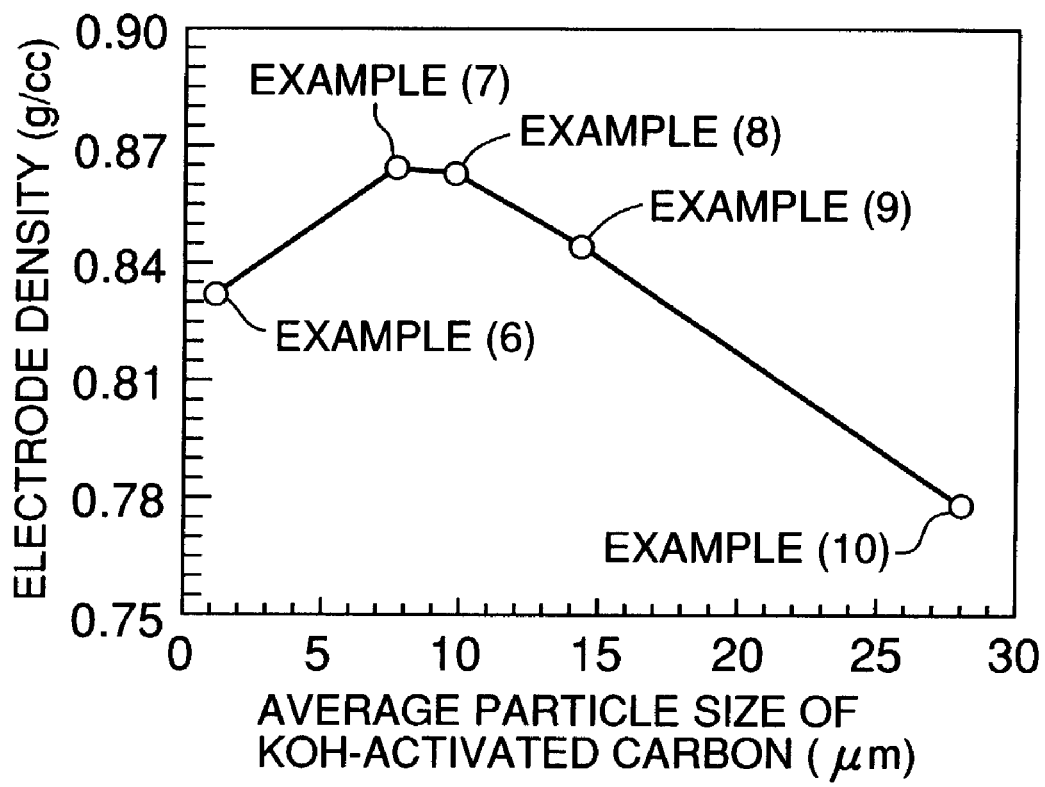
FIG. 6 is a graph showing another example of the relationship between the average particle size of KOH-activated carbon and the electrode density.

FIGS. 5 and 6 are graphs taken based on Table 1 and showing the relationship between the average particle size and the electrode density for examples (1) to (5) and examples (6) to (10). As shown in FIG. 5, if the KOH-activated carbon according to the embodiment of the present invention is used, the electrode density can be increased to about 1 g/cc as in examples (2) and (3). In the case of the comparative example, however, the electrode density is confined to about 0.9 g/cc as in examples (7) and (8).

As is apparent from Table 1 and FIGS. 5 and 6, in examples (1) to (5) made using the KOH-activated carbon according to the embodiment of the present invention, the electrode density is high, as compared with examples (6) to (10) made using the KOH-activated carbon according to the comparative example, and correspondingly, the electrostatic capacity density is high. This is attributable to a difference between the particle shapes of the KOH-activated carbons, as also shown in FIGS. 3 and 4.

Figure 7:
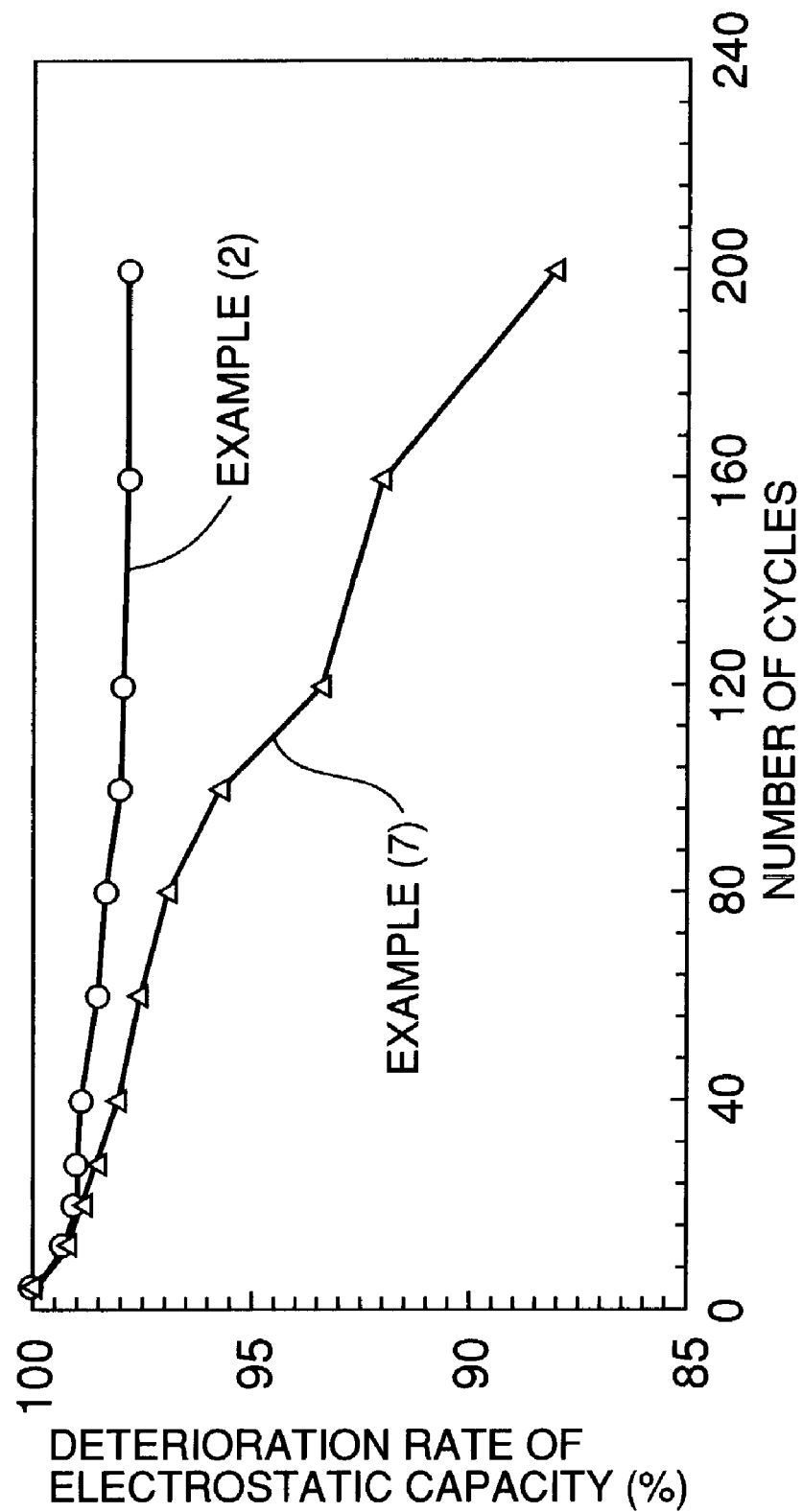
FIG. 7 is a graph showing the relationship between the number of cycles and the rate of deterioration of electrostatic capacity.
Figure 8:
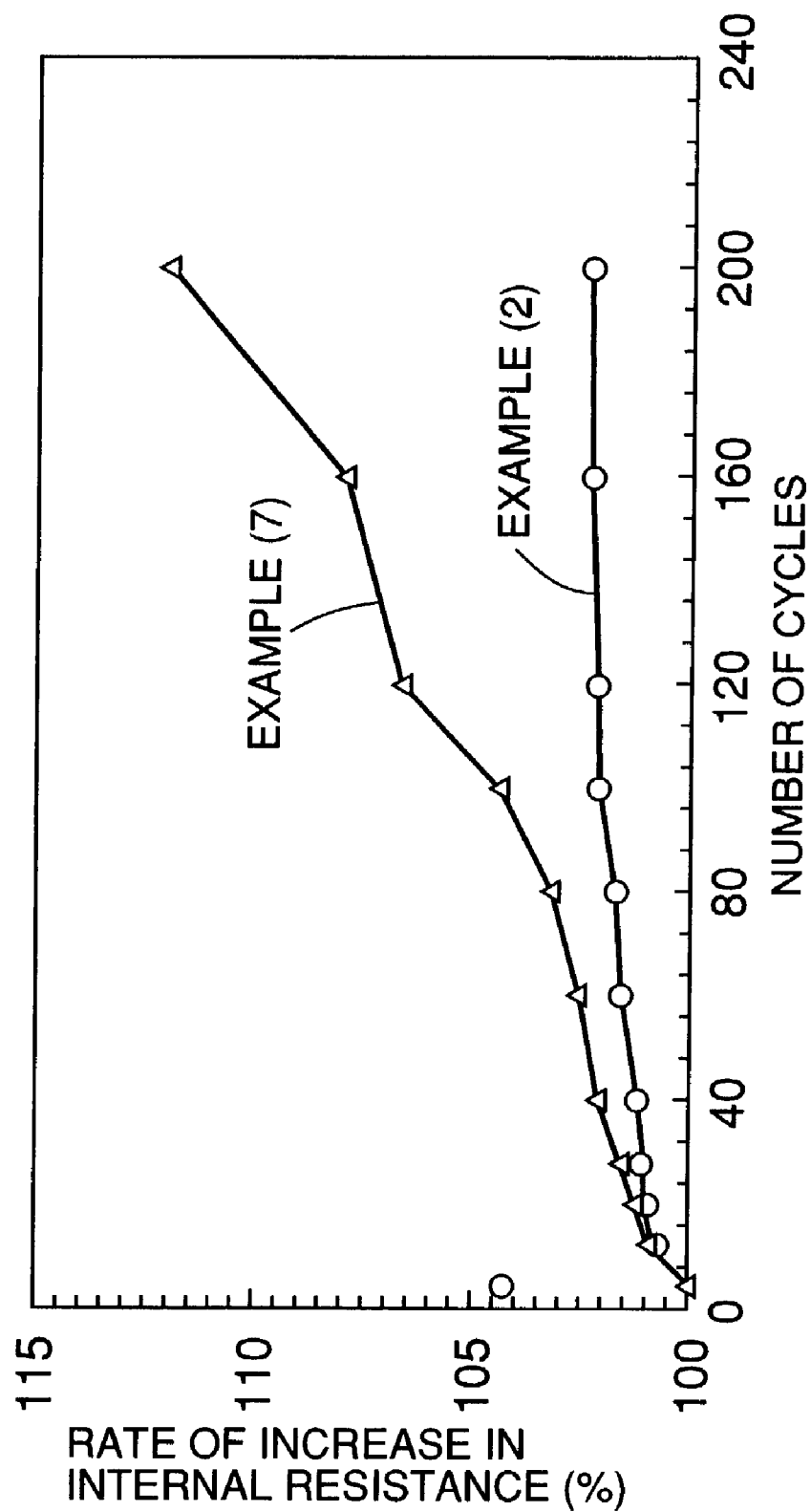
FIG. 8 is a graph showing the relationship between the number of cycles and the rate of increase in internal resistance.

Then, one of examples (1) to (5) having the highest electrode density, i.e., example (2) and one of examples (6) to (10) having the highest electrode density, i.e., example (7) were subjected to a cycle test to examine a rate of deterioration of the electrostatic capacity and a rate of increase in internal resistance, thereby providing results shown in FIGS. 7 and 8. In the cycle test, each of the examples was charged for 20 minutes at 2.5 V and 30 A in an atmosphere of 45° C. and then discharged to zero farad. The charging and discharging were defined as one cycle and repeated 200 cycles. A rate A of deterioration of the electrostatic capacity was determined according to A=(C/B)×100 (%), wherein B represents an initial electrostatic capacity density, and C represents an electrostatic capacity density after a predetermined number of cycles. A rate D of increase in internal resistance was determined according to D=(F/E)×100 (%), wherein E represents an initial internal resistance, and F represents an internal resistance after a predetermined number of cycles.

As is apparent from FIGS. 7 and 8, it can be seen that both of the rate of deterioration of the electrostatic capacity and the rate of increase in internal resistance of example (2) are low, as compared with those of example (7). This is considered to be attributable to the following reason: The KOH-activated carbon made from the mesophase pitch used as the starting material has a nature that it is expanded at an initial stage of repetition of the charging and discharging. Therefore, in example (2), the electrode density is further increased due to such expansion and decreased extremely slowly with the passage of time. On the other hand, in example (7), the separation of the columnar particles due to the expansion and the enlargement of gaps attendant on such separation advance rapidly with the passage of time.

According to Embodiment-I, the alkali-activated carbon comprising fine massive particles can be produced, whereby the electrode density can be increased to enhance the characteristics of the electric double-layer capacitor.

Embodiment-II

Figure 9:
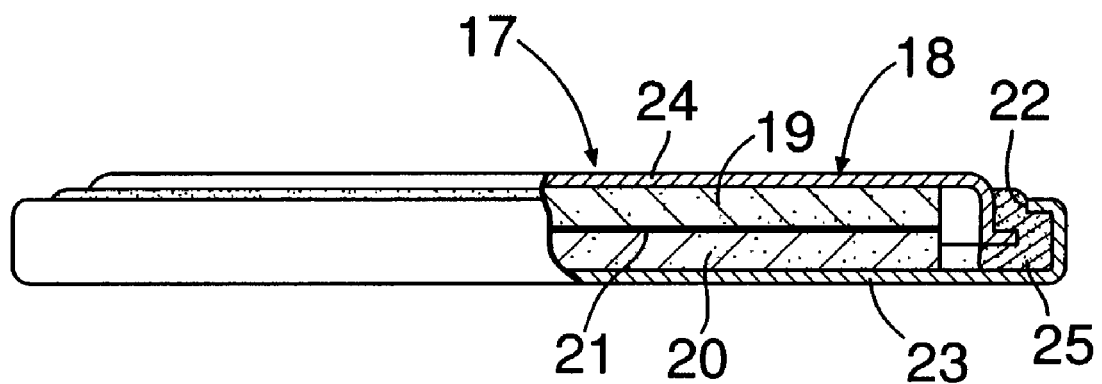
FIG. 9 is a broken-away front view of an essential portion of a button-type electric double-layer capacitor.
Figure 10:
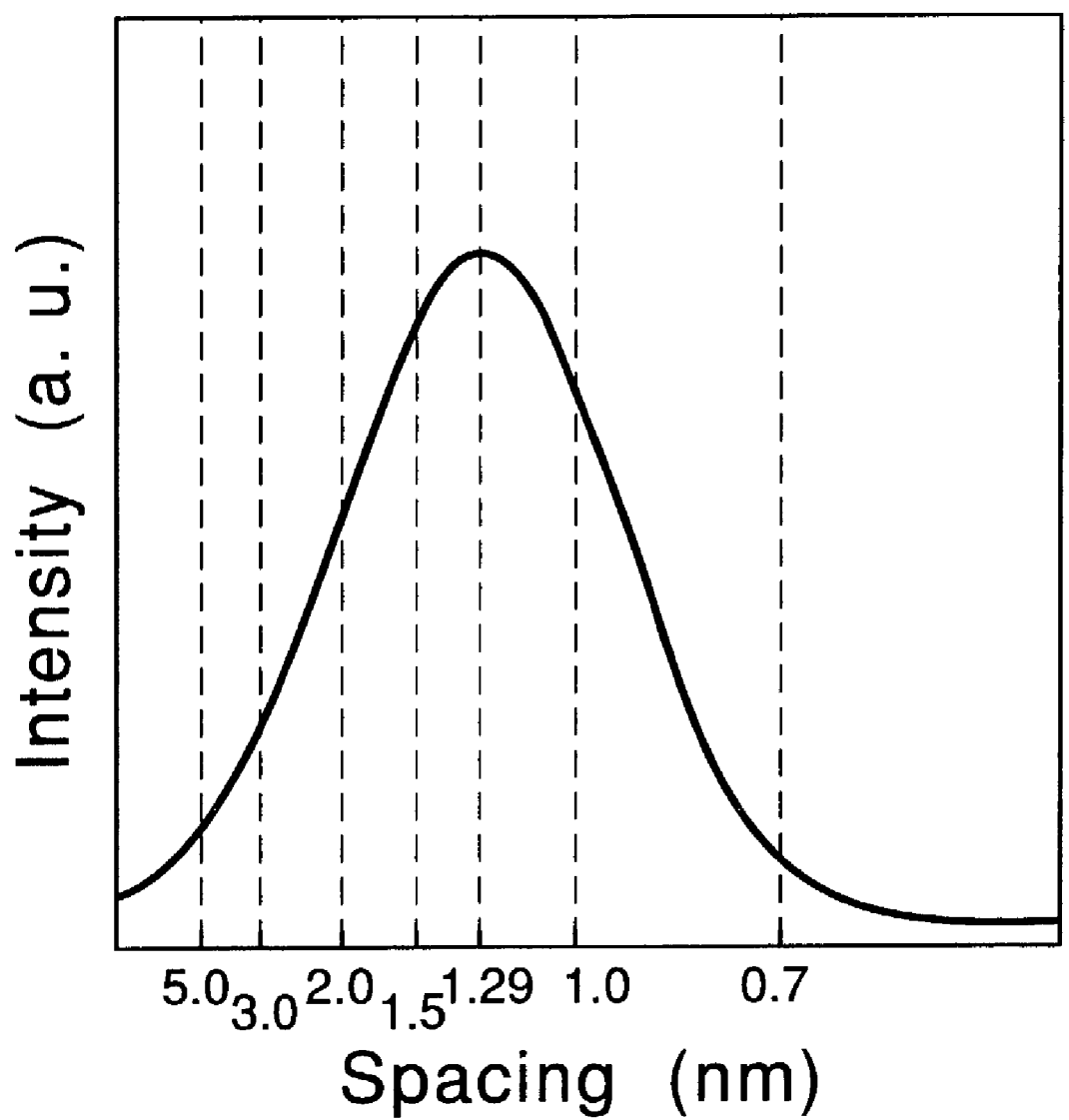
FIG. 10 is a diagram of a primary power spectrum of Al-incorporated activated carbon.
Figure 11:
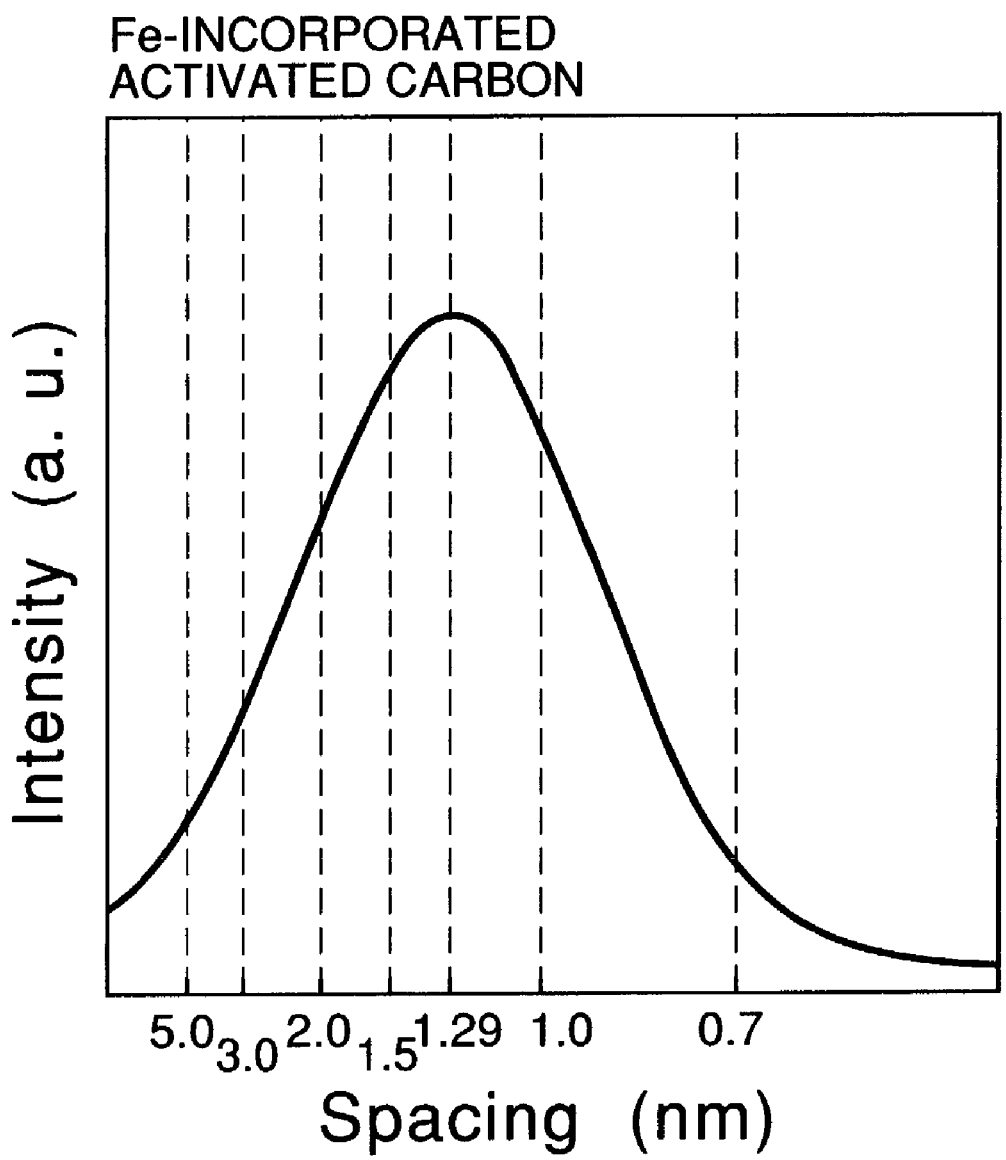
FIG. 11 is a diagram of a primary power spectrum of Fe-incorporated activated carbon.
Figure 12:
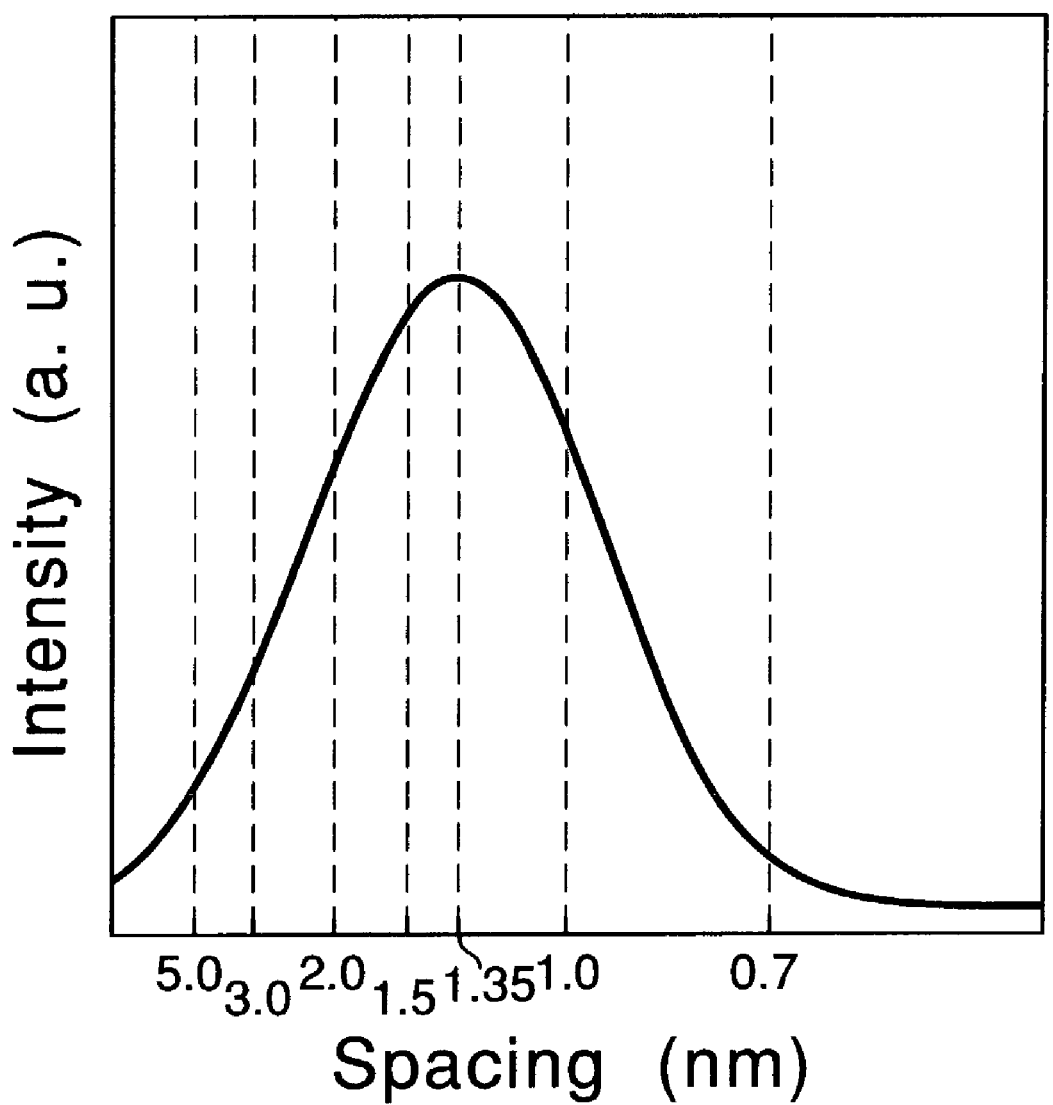
FIG. 12 is a diagram of a primary power spectrum of Ni-incorporated activated carbon.
Figure 13:
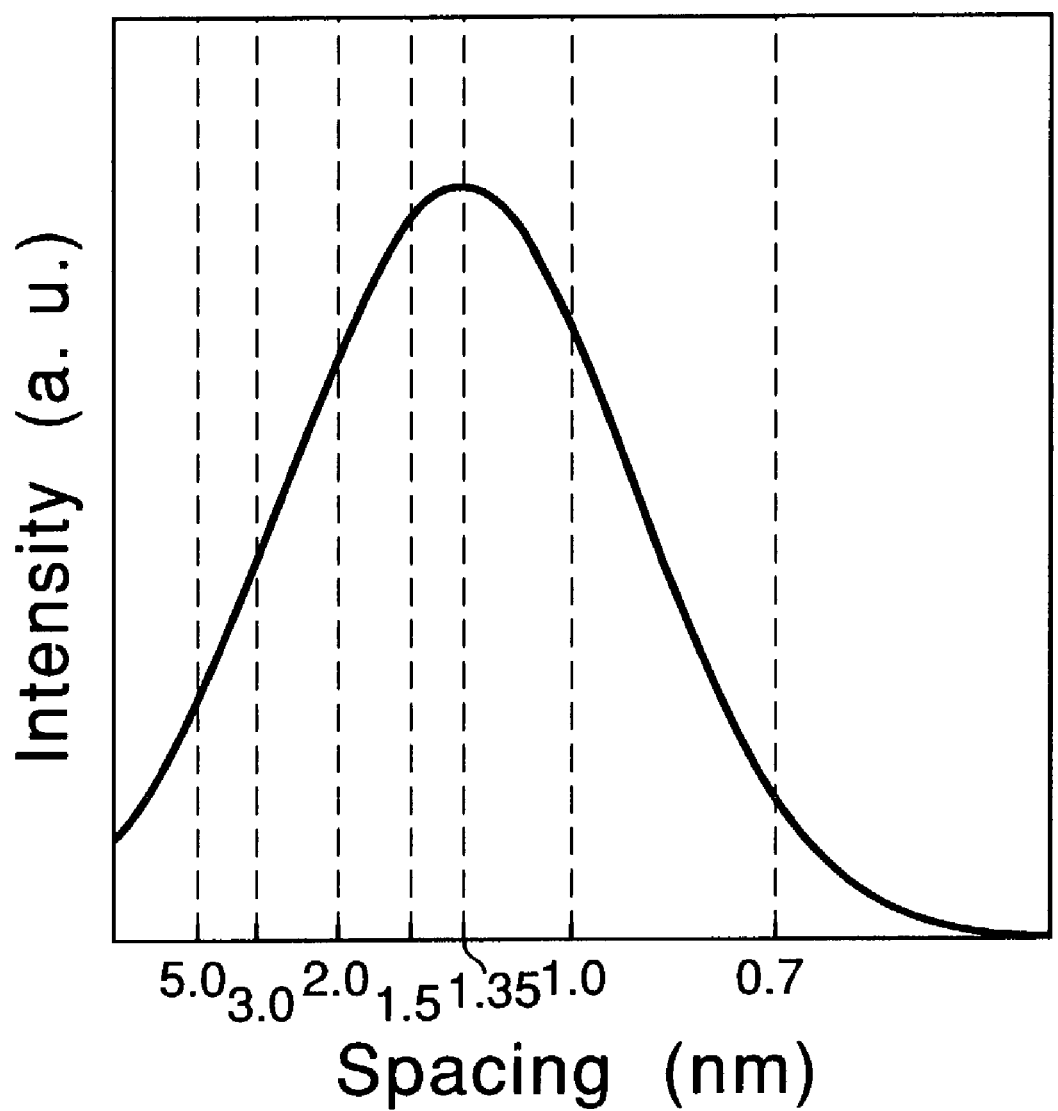
FIG. 13 is a diagram of a primary power spectrum of Co-incorporated activated carbon.
Figure 14:
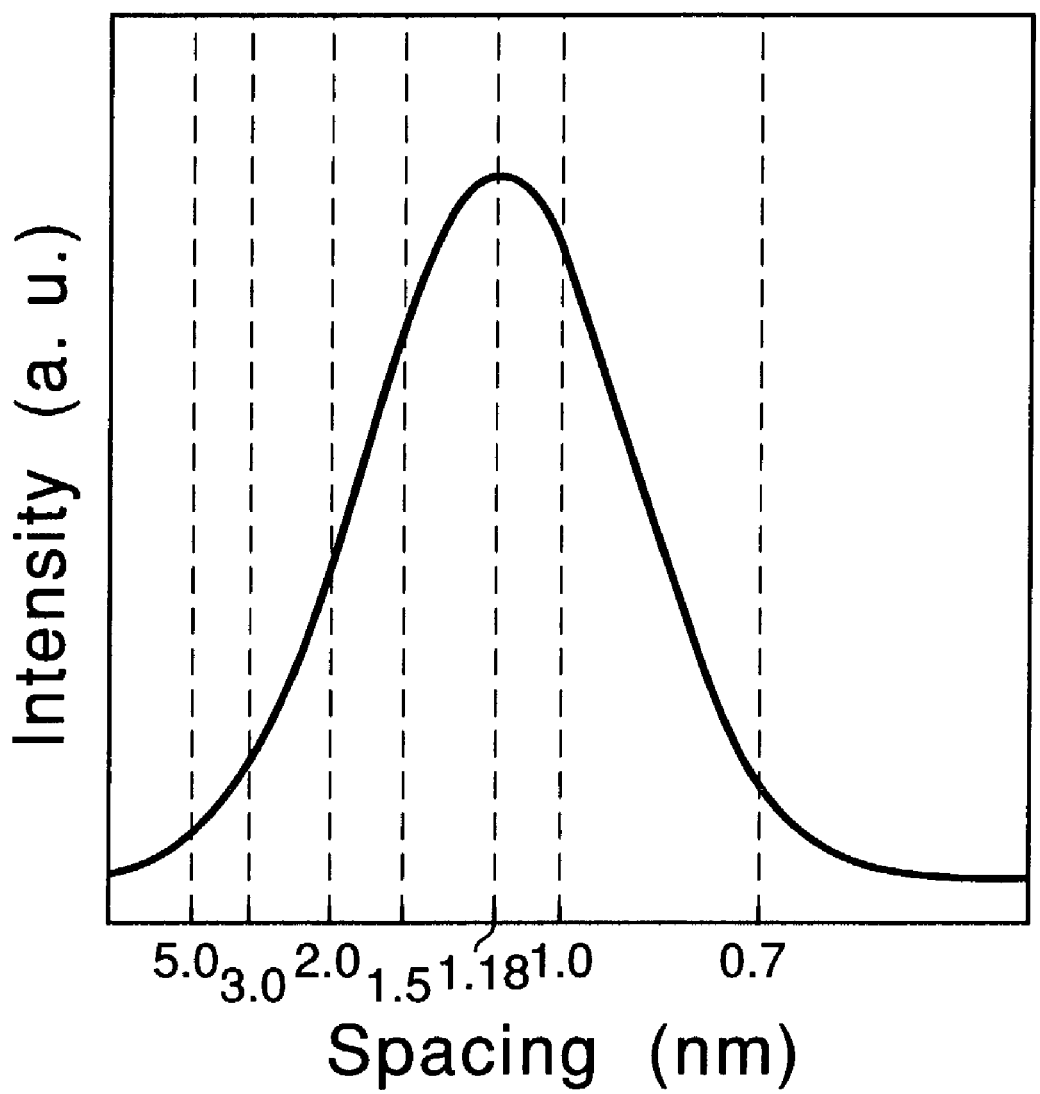
FIG. 14 is a diagram of a primary power spectrum of metal-free activated carbon.

Referring to FIG. 9, a button-type electric double-layer capacitor 17 includes a case 18, a pair of polarizing electrodes 19 and 20 accommodated in the case 18, a spacer 21 sandwiched between the polarizing electrodes 19 and 20, and a liquid electrolyte filled in the case 18. The case 18 comprises a vessel body 23 made of aluminum and having an opening 22, and a lid plate 24 made of aluminum and closing the opening 22. An outer periphery of the lid plate 24 and an inner periphery of the vessel body 23 are sealed from each other by a seal material 25. Each of the polarizing electrodes 19 and 20 is made of a mixture comprising activated carbon, a conductive filler and a binder.

Activated carbon for the electrode is produced by subjecting a starting material having a metal compound incorporated therein to a carbonizing treatment and then to an activating treatment. Examples of the starting material for the activated carbon, which may be used, are various synthetic resins, petroleum pitch, coal pitch, coal tar and the like. At least one compound selected from the group consisting of a metal chloride, a metal oxide and an organic metal compound is used as the metal compound, and at least one metal selected from the group consisting of Al, Ni, Fe and Co corresponds to a metal in the metal compound. More specifically, the chlorides include $AlCl_3$, $NiCl_2$, $FeCl_3$, $CoCl_2$ and the like; the oxides include $AlO_3$, $NiO_2$, $Fe_2O_3$, $CoO_2$ and the like; the organic metal compounds include aluminum acetyl acetate, alkoxide and the like.

The amount of metal compound incorporated is set so that a relation, 0.1% by weight $\leq J \leq$ 10% by weight is established in {H/(G+H)}×100=J (% by weight), wherein G represents an amount of starting material used for activated carbon; H represents an amount of metal incorporated; and J represents a rate of metal incorporated.

The carbonizing treatment is carried out under conditions of a temperature in a range of 500 to 1,000° C. and a time in a range of 0.5 to 10 hours in an inert atmosphere. An alkali activating treatment is utilized as the activating treatment and carried out under conditions of a temperature in a range of 500 to 1,000° C. and a time in a range of 0.5 to 10 hours in the presence of KOH in an inert atmosphere. As required, an infusibilizing treatment may be carried out prior to the carbonizing treatment under conditions of a temperature in a range of 250 to 500° C. and a time in a range of 30 to 120 minutes in an atmospheric air current.

If the above-described measure is employed, the metal compound is decomposed and gasified during the carbonizing treatment, whereby fine pores are created by the resulting gas. In the activating treatment, the fine pores serve as a source, and the metal serves as an assistant or a catalyst to promote the creation of the pores. Therefore, the diameter of each of pores in the activated carbon for the electrode is enlarged. In addition, the electric conductivity of the activated carbon itself is increased by the incorporation of the metal. Thus, it is possible to reduce the internal resistance of the electric double-layer capacitor. On the other hand, the electrostatic capacity density of the activated carbon for the electrode is not varied by the enlargement of the pores to this extent and hence, the activated carbon has an electrostatic capacity density as hitherto.

However, if the rate J of metal incorporated is lower than 0.1% by weight, an effect of incorporation of the metal is not provided. On the other hand, if the rate J of metal incorporated is higher than 10% by weight, the creation of the pores advances excessively, thereby bringing about a reduction in electrode density and lowering the electrostatic capacity density just slightly. The rate J of metal incorporated is preferably in a range of 0.5% by weight$\leq J \leq 5.0\%$ by weight.

When the metal compound is incorporated into the starting material for the activated carbon, if the melting points of them are near to each other, a high dispersibility of the metal compound is provided, even if the metal compound and the starting material are mixed together and molten in their powdery states. On the other hand, if a difference between the melting points of the metal compound and the starting material is large, it is preferable that they be dissolved and mixed in an organic solvent such as quinoline from the viewpoint of the enhancement of the dispersibility of the metal compound.

Particular examples will be described below.

EXAMPLE-I (a) Aluminum acetyl acetate was incorporated in amount of 3.65 g into 30 g of petroleum mesophase pitch, and they were pulverized and mixed together sufficiently using a mortar. In this case, a rate J of aluminum incorporated was equal to 3% by weight. (b) The mixture was subjected to an infusibilizing treatment for 90 minutes at 480° C. in an atmospheric air current. The mixture was molten and cooled to assume a massive state. The resulting massive material was pulverized to provide a powder. (c) The powder was subjected to a carbonizing treatment for one hour at 700° C. in a current of nitrogen gas to provide a carbonized powder. (d) An amount of KOH twice the weight of the carbonized powder was mixed to the carbonized powder, and the resulting mixture was subjected to an alkali activating treatment (a potassium activating treatment) for 5 hours at 800° C. in a current of nitrogen gas to provide activated carbon. Then, the activated carbon was subjected sequentially to an acid washing, a water washing, a filtration and a drying. This activated carbon for the electrode is called Al-incorporated activated carbon.

EXAMPLE-II

Activated carbon was produced in the same manner as in Example-I, except that the aluminum acetyl acetate was replaced by iron acetyl acetate. A rate J of iron incorporated in this case is equal to 3% by weight as in Example-I. This activated carbon for the electrode is called Fe-Incorporated activated carbon.

EXAMPLE-III

Activated carbon was produced in the same manner as in Example-I, except that the aluminum acetyl acetate was replaced by nickel acetyl acetate. A rate J of nickel incorporated in this case is equal to 3% by weight as in Example-I. This activated carbon for the electrode is called Ni-incorporated activated carbon.

EXAMPLE-IV

Activated carbon was produced in the same manner as in Example-I, except that the aluminum acetylacetonate was replaced by cobalt acetylacetonate. A rate J of cobalt incorporated in this case is equal to 3% by weight as in Example-I. This activated carbon for the electrode is called Co-incorporated activated carbon.

EXAMPLE-V

Activated carbon was produced through steps (b) to (d) in Example-I using a mesophase pitch precursor similar to that in Example-I, but containing no organic metal compound incorporated therein. This activated carbon for the electrode is called metal-free activated carbon.

The Al-incorporated activated carbon, the Fe-incorporated activated carbon, the Ni-incorporated activated carbon, the Co-incorporated activated carbon and the metal-free activated carbon produced in Example-I to Example-IV and Example-V were subjected to a TEM shooting, and a distribution of pore diameters and a fractal dimension were determined by an image picture analysis. Shooting conditions areas follows: Phillips CM120 was used; an acceleration voltage was set at 120 kV; and a shooting magnification was set at 200,000. Conditions for the analysis of the distribution of pore diameters were set as follows: The TEM negative image was digitalized at a resolution of 600 dpi and at 512×512 pixels with 256 levels of gray; a two-dimensional FFT was carried out and then, a periodic integration was carried out, thereby providing a one-dimensional power spectrum.

FIGS. 10 to 14 show one-dimensional power spectra for the Al-incorporated activated carbon and the like. Most-frequent values of pore diameters of the Al-incorporated activated carbon and the like obtained from the one-dimensional power spectra are as shown in Table 2.

TABLE 2

|  | Most-frequent value of pore diameter (nm) |
|---|---|
| Al-incorporated activated carbon | 1.29 |
| Fe-incorporated activated carbon | 1.29 |
| Ni-incorporated activated carbon | 1.35 |
| Co-incorporated activated carbon | 1.35 |
| Metal-free activated carbon | 1.18 |

It can be seen from Table 2 that the diameters of the pores in the Al-incorporated activated carbon and the like were increased, as compared with those in the metal-free activated carbon.

Then, a mixture comprising the Al-incorporated activated carbon produced in Example-I, a graphite powder (a conductive filler) and PTFE (a binder) blended at a ratio of 90:5:5 by weight was kneaded sufficiently. The kneaded mixture was subjected to a rolling, thereby producing two polarizing electrodes 19 and 20 having a diameter of 20 mm and a thickness of 185 μm. A button-type electric double-layer capacitor 17 shown in FIG. 9 was assembled using the polarizing electrodes 19 and 20, a spacer 21 made of PTFE and having a thickness of 75 μm and a solution of 1.4 mol/L of TEMA.BF$_4$ [(C$_2$H$_5$)$_3$CH$_3$N.BF$_4$(triethylmethyl ammonium borofluoride)] in PC (propylene carbonate) as a liquid electrolyte. A button-type electric double-layer capacitor 17 was also assembled in a manner similar to that described above, using the Fe-incorporated activated carbon, the Ni-incorporated activated carbon, the Co-incorporated activated carbon produced in Example-II to Example-IV and the metal-free activated carbon produced in Example-V.

For each of the capacitors 17, an electrical resistivity was measured under conditions of a charging voltage of 2.5 V and a charging current of 5 mA, and an electrostatic capacity density per unit weight and an electrostatic capacity density per unit volume of the activated carbon were calculated, thereby providing results shown in Table 3. The electrode density is also given in Table 2.

TABLE 3

| | Electric double-layer capacitor | | Activated carbon | |
| --- | --- | --- | --- | --- |
| | Electrode density (g/cc) | Electrical resistivity (Ωcm$^2$) | Electrostatic capacity density (F/g) | Electrostatic capacity density (F/cc) |
| Al-incorporated activated carbon | 0.956 | 6.5 | 34.1 | 32.6 |
| Fe-incorporated activated carbon | 0.976 | 6.8 | 33.9 | 33.0 |
| Ni-incorporated activated carbon | 0.973 | 6.3 | 34.3 | 33.4 |
| Co-incorporated activated carbon | 0.951 | 6.4 | 34.4 | 32.7 |
| Metal-free activated carbon | 0.984 | 9.2 | 33.8 | 33.3 |

As is apparent from Table 3, it can be seen that the electrical resistivity of the electric double-layer capacitor 17 made using the polarizing electrodes 19 and 20 produced from the Al-incorporated activated carbon and the like is low, as compared with that of the electric double-layer capacitor 17 made using the polarizing electrode produced from the metal-free activated carbon. On the other hand, it can be seen that the electrostatic capacity densities of the activated carbons are equivalent, irrespective of the presence and absence of the incorporated metal.

According to Embodiment II, it is possible to produce activated carbon for an electrode, which has a pore diameter such that the diffusion of a liquid electrolyte and ions is liable to occur, a relatively high conductivity and an electrostatic capacity density as hitherto. Such activated carbon for the electrode is effective for reducing the internal resistance of the electric double-layer capacitor.

Embodiment III

Activated carbon for an electrode is produced by subjecting a graphitizable carbon powder to an alkali activating treatment. Examples of the graphitizable carbon, which may be used, are carbonized powders, carbon fibers, carbonized pitches and the like made using coke, petroleum pitch, mesophase pitch, polyvinyl chloride, polyamide, PAN and the like as a starting material.

A mixed activating agent comprising KOH and NaOH is used as an alkali-activating agent. It can be considered that NaOH in the mixed activating agent exhibits a function to decrease the diameter of pores in the activated carbon and reduce the distance between the carbon crystallites to strengthen the crosslinkage bond of —C—O—C— (therefore, reduce the decomposition of the crosslinkage). Thus, it is possible to reduce the amount of polarizing electrodes 3 and 4 expanded during charging, as compared with the case where only KOH is used.

If the content of NaOH in the mixed activating agent is increased, the amount of polarizing electrodes 3 and 4 expanded is decreased gradually, but if the content of NaOH reaches 100% by weight or near 100% by weight, the resistance value of the polarizing electrodes 3 and 4 is increased suddenly. This is because an effect of KOH for suppressing the function of NaOH for reducing the diameter of pores is reduced with a reduction in content of NaOH.

Therefore, the content of NaOH in the mixed activating agent is set in a range of 10% by weight ≦ NaOH ≦ 90% by weight. If the content of NaOH is lower than 10% by weight, the NaOH addition effect is small and hence, the amount of polarizing electrodes 3 and 4 expanded during charging is increased. On the other hand, a disadvantage due to the content of NaOH higher than 90% by weight is as described above.

In the alkali activating treatment, a treating temperature T is set in a range of 500° C. ≦ T ≦ 1,000° C., and a treating time t is set in a range of 10 minutes ≦ t ≦ 10 hours. If the treating temperature T is lower than 500° C., or if the treating time t is shorter than 10 minutes, the activation is hard to advance. On the other hand, if T > 1,000° C. or if t > 10 hours, the excessive activation occurs to reduce the density of the activated carbon and the yield of the activated carbon. If the heated state to 350 to 500° C. is maintained for 10 minutes to 3 hours in the course of raising the temperature in the alkali activating treatment, the graphitizable carbon powder and the mixed activating agent are soaked and dehydrated sufficiently, whereby the activation can be allowed to advance smoothly.

Particular examples will be described below.

I-[1] Production of Activated Carbon

EXAMPLE-I

A. Production of Graphitizable Carbon Powder (a) Granulatable mesophase pitch was subjected to an infusibilizing treatment at 320° C. for 10 minutes in an atmospheric air current and then, the treated powder was subjected to a carbonizing treatment at 700° C. for 1 hour in a current of nitrogen gas to provide a carbonized powder. (b) The carbonized powder was subjected to a pulverizing treatment to regulate the particle size. The density of the carbonized powder was 1.55 g/cc.

B. Alkali Activating Treatment (a) 2.5 grams of the carbonized powder and 5.0 grams of a mixed activating agent, namely, a pellet mixture comprising a KOH pellet and an NaOH pellet mixed at a predetermined ratio were placed into a mortar, where the pellet mixture was mixed sufficiently with the carbonized powder, while being pulverized. Then, the resulting mixture was packed into a boat made of INCONEL. (b) The boat was placed into a tubular furnace and heated to a predetermined temperature at a temperature-raising rate of 200° C./hr in a current of nitrogen gas of 60 ml/min and maintained at such temperature for a predetermined time. Then, the boat was removed from the tubular furnace and placed into an ultrasonic wave-washing vessel, where the treated powder was subjected to a washing treatment with pure water for 15 minutes to remove KOH. Thereafter, the treated powder was subjected to the removal of NaOH by HCl washing, the washing with about 3 liters of warm water, the filtration and the drying, thereby producing activated carbon.

EXAMPLE-II

For comparison, activated carbon was produced in a manner similar to that in Example-I, except that an activating agent comprising only KOH or only NaOH was used.

I-[2] Conditions for Activating Treatment

Conditions for the activating treatment for examples 1 to 6 of activated carbon produced in Example-I and examples 7 to 11 of activated carbon produced in Example-II are as shown in Table 4.

TABLE 4

| Example of activated carbon | Mixed activating agent | | Activating treatment | |
|---|---|---|---|---|
| | KOH (% by weight) | NaOH (% by weight) | Temperature (° C.) | Time (hr) |
| 1 | 10 | 90 | 600 | 1 |
| 2 | 20 | 80 | 550 | 5 |
| 3 | 50 | 50 | 600 | 1 |
| 4 | 80 | 20 | 700 | 3 |
| 5 | 80 | 20 | 800 | 3 |
| 6 | 90 | 10 | 700 | 3 |
| 7 | 100 | 0 | 800 | 5 |
| 8 | 100 | 0 | 700 | 5 |
| 9 | 100 | 0 | 650 | 5 |
| 10 | 100 | 0 | 600 | 5 |
| 11 | 0 | 100 | 600 | 1 |

II-[1] Fabrication of Button-Type Electric Double-Layer Capacitor (see FIG. 9)

Example 1 of the activated carbon, carbon black (a conductive filler) and PTFE (a binder) were weighed so that a weight ratio of 85.6:9.4:5 was provided. Then, the weighed materials were kneaded together and thereafter, the kneaded mixture was subjected to a rolling, thereby fabricating an electrode sheet having a thickness of 185 μm. Two polarizing electrodes 19 and 20 having a diameter of 20 mm were cut from the electrode sheet, and a button-type electric double-layer capacitor 17 was fabricated using the two polarizing electrodes 19 and 20, a spacer 21 made of glass fiber and having a diameter of 20 mm and a thickness of 0.35 mm, a liquid electrolyte and the like. A solution of 1.4 M of triethylmethyl ammonium tetrafluoroborate [$(C_2H_5)_3CH_3NBF_4$] in propylene carbonate was used as the liquid electrolyte.

Such button-type electric double-layer capacitor 17 made using example 1 of the activated carbon is called a sample 1. Samples 2 to 11 of button-type electric double-layer capacitors 17 were fabricated in the same manner as described above using examples 2 to 11 of the activated carbons.

II-[2] Electrostatic Capacity Density of Activated Carbon and Electric Resistance Value of Polarizing Electrode Sample 1 was subjected to a charging/discharging cycle treatment which will be described below. Then, electrostatic capacity densities (F/g, F/cc) of example 1 of the activated carbon were determined in an energy conversion process, and an expedient electric resistance value ($\Omega \cdot cm^2$) of the polarizing electrode was calculated.

In the charging/discharging cycle treatment, such a process was employed that the charging for 90 minutes and the discharging for 90 minutes were conducted two times at 2.7 V, two times at 2.8 V, two times at 3.0 V and two times at 2.7V.

Samples 2 to 11 were also subjected to a similar charging/discharging cycle treatment, whereby electrostatic capacity densities of examples 2 to 11 of the activated carbons and the like were determined.

II-[3] Measurement of Expansion Rate of Polarizing Electrode (See FIG. 9)

Figure 15:
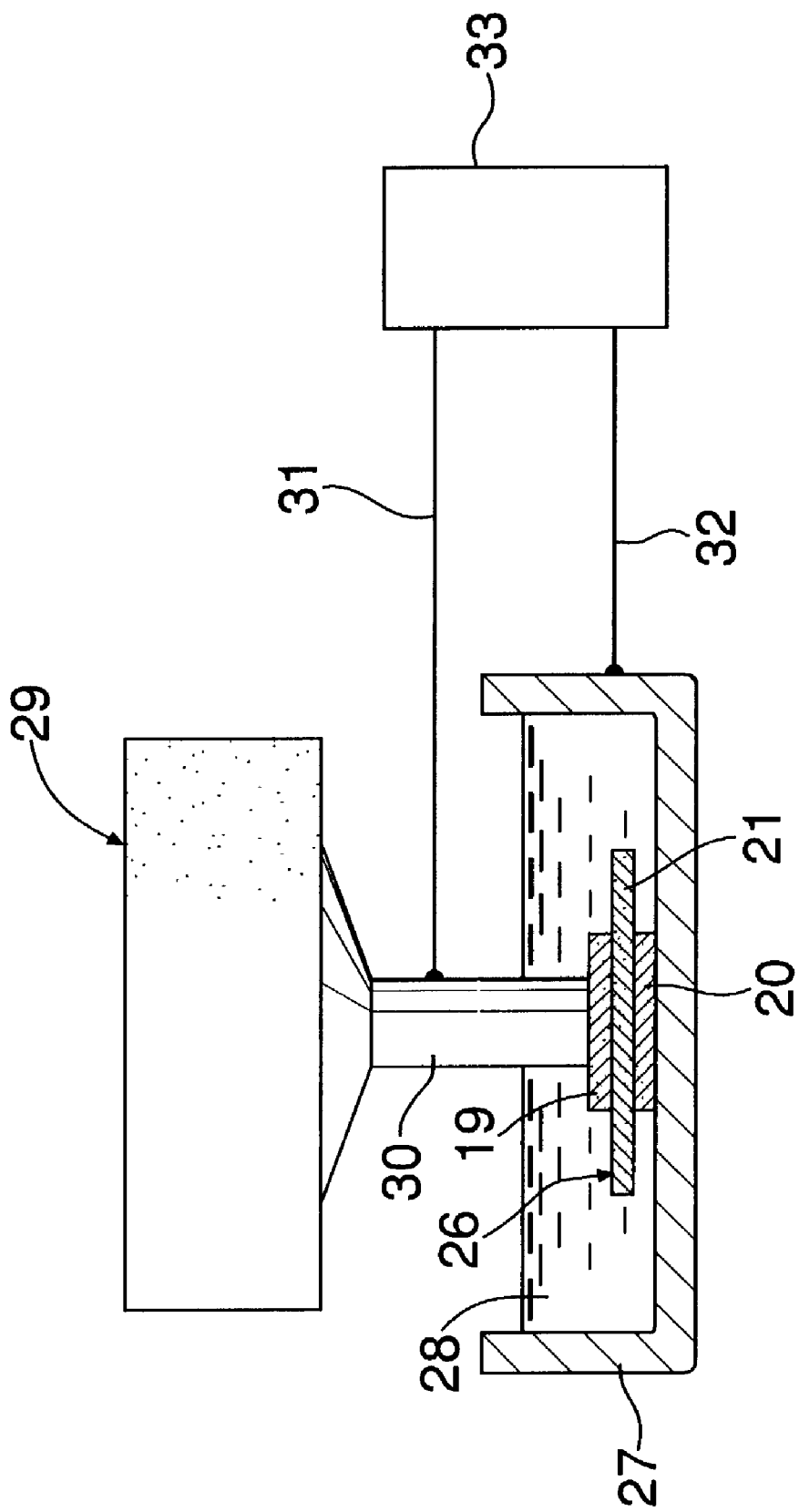
FIG. 15 is a schematic illustration showing an apparatus for measuring an expansion rate of a polarizing electrode.

As is shown in FIG. 15, a laminate 26 comprising two polarizing electrodes 19 and 20 similar to those described above and made using example 1 of the activated carbon and a glass fiber spacer 21 having a diameter of 30 mm and a thickness of 0.24 mm and interposed between the polarizing electrodes 19 and 20 was placed as sample 1 onto an internal bottom surface of a liquid bath 27 made of aluminum. A liquid electrolyte 28 similar to that described above was poured into the liquid bath 27 and then, a lower end face of a copper-made vertical portion 30 of a pressing member 29 was put on an upper surface of the upper polarizing electrode 19. Further, the vertical portion 30 and the liquid bath 27 were connected to a charging/discharging circuit 33 through connecting wires 31 and 32. In a state in which a load applied to the polarizing electrodes 19 and 20 by the pressing member 29 was set at 3 kg, the charging and discharging were conducted repeatedly at 5 mA and 2.7 V using the charging/discharging circuit 33. A total amount of polarizing electrodes 19 and 20 expanded in a thicknesswise direction during the charging was measured in terms of an amount of pressing member 29 displaced, using a laser displacement meter.

Samples 2 to 11 of laminates 26 having the polarizing electrodes 19 and 20 made using examples 2 to 11 of the activated carbon were also subjected to a similar measurement.

III Consideration

Table 5 shows the composition of the mixed activating agent, the electrode density, the electrostatic capacity density (F/g) of the activated carbon per unit weight, the electrostatic capacity density (F/cc) of the activated carbon per unit volume and the expansion rate of a polarizing electrode during the charging and the expedient electric resistance ($\Omega \cdot cm^2$), for samples (including the button-type electric double-layer capacitor 17 and the laminate 26) 1 to 11.

TABLE 5

| | Mixed activating agent | | | | Polarizing electrode | | |
|---|---|---|---|---|---|---|---|
| | KOH (% by weight) | NaOH (% by weight) | Electrode density (g/cc) | Electrostatic capacity density | | Expansion rate (%) | Electric resistance value ($\Omega \cdot cm^2$) |
| Sample | | | | (F/g) | (F/cc) | | |
| 1 | 10 | 90 | 0.90 | 32.7 | 29.4 | 121 | 25.8 |
| 2 | 20 | 80 | 0.84 | 37.0 | 31.1 | 123 | 19.5 |
| 3 | 50 | 50 | 0.89 | 34.0 | 30.3 | 130 | 15.0 |
| 4 | 80 | 20 | 0.79 | 38.0 | 30.0 | 131 | 12.1 |
| 5 | 80 | 20 | 0.81 | 38.0 | 30.9 | 131 | 11.7 |
| 6 | 90 | 10 | 0.82 | 38.6 | 31.6 | 132 | 11.9 |
| 7 | 100 | 0 | 0.88 | 35.4 | 31.2 | 176 | 8.1 |
| 8 | 100 | 0 | 0.87 | 38.2 | 33.2 | 165 | 8.0 |
| 9 | 100 | 0 | 0.91 | 36.0 | 32.8 | 153 | 8.5 |
| 10 | 100 | 0 | 0.91 | 33.0 | 30.0 | 152 | 10.0 |
| 11 | 0 | 100 | 0.91 | 33.8 | 30.7 | — | 69.7 |

Figure 16:
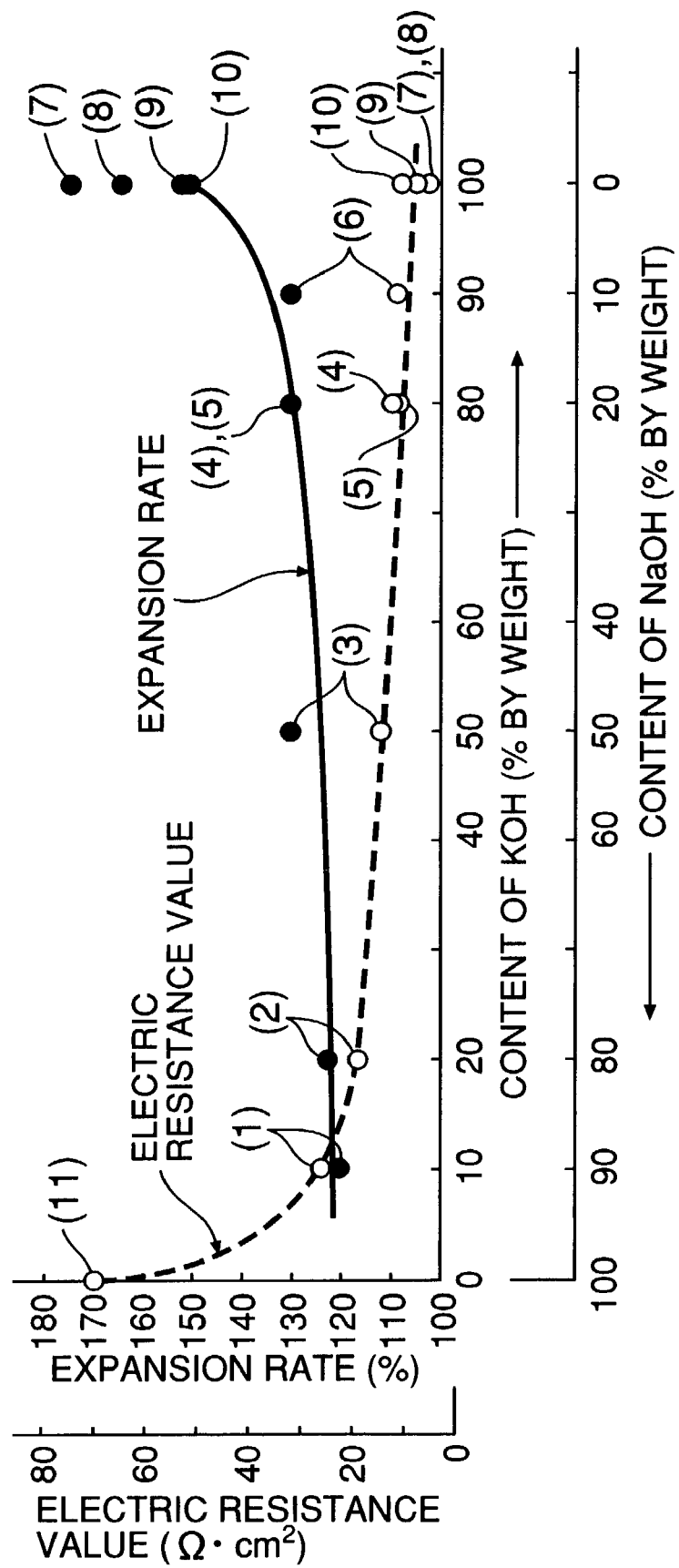
FIG. 16 is a graph showing the relationship between the contents of KOH and NaOH and the electric resistance value as well as the expansion rate.

FIG. 16 is a graph taken based on Table 5 and showing the relationship between the content of KOH and the expansion rate of the polarizing electrode as well as the electric resistance value for samples 1 to 11. In FIG. 16, (1) to (11) correspond to samples 1 to 11.

As is apparent from FIG. 16, if the content of KOH in the mixed activating agent is decreased and the content of NaOH in the mixed activating agent is increased, the expansion rate of the polarizing electrodes 19 and 20 during the charging is decreased. Particularly, if the content of NaOH in the mixed activating agent is set in a range of 10% by weight≦NaOH≦90% by weight and hence, the content of KOH in the mixed activating agent is set in a range of 10% by weight≦KOH≦90% by weight, it is possible to produce activated carbon, from which a polarizing electrode having an expansion rate during charging lower than 150% and a low electric resistance value can be produced.

According to Embodiment III, it is possible to produce activated carbon by employing the above-described measure, from which a polarizing electrode whose expansion rate during charging can be reduced can be produced, as well as activated carbon, from which a polarizing electrode whose expansion rate and electric resistance value during charging can be reduced can be produced.

Embodiment IV

To produce activated carbon for an electrode, the following steps are used: a step of subjecting a starting material for activated carbon, which is an aggregate of solids, to an oxygen-adding treatment to provide an oxygen-added material with oxygen dispersed in the entire insides of the solids; a step of subjecting the oxygen-added material to a carbonizing treatment to provide a carbonized material, and a step of subjecting the carbonized material to an activating treatment to provide activated carbon.

If the oxygen-adding treatment described above has been carried out to disperse oxygen in the entire insides of the solids, when a polarizing electrode is formed using the activated carbon produced through the subsequent carbonating and activating treatments of the oxygen-added material, the amount of polarizing electrode expanded during charging can be decreased.

Examples of the starting material for the activated carbon, which may be used, are a powder, an aggregate of fibers (including an aggregate of fibrous materials made by spinning) and the like produced from petroleum pitch, mesophase pitch, polyvinyl chloride, polyimide, PAN and the like. Therefore, solids in the powder are individual particles, and solids in the aggregate of fibers are individual fibers or fibrous materials.

The oxygen-adding treatment is carried out by heating the starting material for the activated carbon to a predetermined temperature at a predetermined temperature increasing rate in the air, or maintaining the starting material after reaching a predetermined temperature, at such temperature for a predetermined time.

In this case, if the weight of the starting material for the activated carbon is represented by W, and the weight of the oxygen-added material, namely, W+amount of oxygen is represented by X, an increasing rate Y in weight upon the oxygen-adding treatment is represented by $Y=\{(X-W)/W\}\times 100$ (%) and set in a range of $2\% \leqq Y \leqq 20\%$. If the increasing rate Y in weight is lower than 2%, the effect of suppressing the amount of polarizing electrode expanded is insufficient. On the other hand, if Y>20%, carbon is burned during the next step of the carbonizing treatment, resulting in a decreased yield of a carbonized material.

In order to ensure that the increasing rate Y in weight is fallen into the above-described range, the temperature increasing rate V in the oxygen-adding treatment is set in a range of $5°$ C./min$\leqq V \leqq 20°$ C./min; the heating time T1 is set in a range of $250°$ C.$\leqq T1 \leqq 350°$ C.; and the maintaining time (hr) t1 is set in a range of 1 hour$\leqq t1 \leqq 10$ hours.

In order to promote the oxygen-adding treatment, any of $P_2O_5$, quinone, hydroxyquinone and the like, or any of derivatives of them may be used.

The carbonizing treatment is carried out under known conditions conventionally employed in a producing process of such a type. Specifically, the carbonizing treatment is carried out in an atmosphere of an inert gas at a heating temperature T2 set in a range of $600°$ C.$\leqq T2 \leqq 1,000°$ C. and for a heating time t2 set in a range of 1 hour$\leqq t2 \leqq 10$ hours.

An alkali activating treatment using KOH is utilized as the activating treatment and carried out under known conditions conventionally employed in a producing process of such a type. Specifically, the activating treatment is carried out in an atmosphere of an inert gas at a heating temperature T3 set in a range of $500°$ C.$\leqq T3 \leqq 1,000°$ C. and for a heating time t3 set in a range of 1 hour$\leqq t3 \leqq 10$ hour.

Particular examples will be described below.

A. Production of Fibrous Activated Carbon

1. Oxygen-Adding Treatment (a) An aggregate of fibrous materials having a diameter of 13 μm was produced using mesophase pitch by spinning. (b) The aggregate was subjected to an oxygen-adding treatment under different conditions, thereby producing examples 1 to 9 of oxygen-added materials. (c) An increasing rate Y in weight of each of examples 1 to 9 was determined.

Table 6 shows the condition for the oxygen-adding treatment and the increasing rate Y in weight for examples 1 to 9.

TABLE 6

| Oxygen-added material | Condition for oxygen-adding treatment | | | Increasing rate Y in weight (%) |
|---|---|---|---|---|
| | Temperature increasing rate V (° C./min) | Heating temperature T1 (° C.) | Maintaining time t1 (° C.) | |
| Example 1 | 28 | 280 | — | 1.0 |
| Example 2 | 5 | 280 | — | 3.5 |
| Example 3 | 5 | 300 | — | 5.9 |
| Example 4 | 5 | 320 | — | 6.7 |
| Example 5 | 5 | 320 | 0.5 | 9.7 |
| Example 6 | 3 | 280 | — | 4.3 |
| Example 7 | 3 | 300 | — | 5.9 |
| Example 8 | 3 | 320 | — | 7.4 |
| Example 9 | 3 | 320 | 2.0 | 10.6 |

No description in the column of maintaining time in Table 6 means that the oxygen-added material was removed from a treating furnace immediately when the temperature within the furnace reached the heating temperature.

2. Carbonizing Treatment

Examples 1 to 9 of the oxygen-added material were subjected to a carbonizing treatment at 700° C. for one hour in a current of nitrogen gas to provide examples 1 to 9 of a graphitizable carbon fiber corresponding to examples 1 to 9 of the oxygen-added material.

True densities of examples 1 to 9 are as shown in Table 7. Each of the true densities was evaluated by a specific gravity conversion process using methanol.

TABLE 7

| Carbon fiber | True density (g/cc) |
| --- | --- |
| Example 1 | 1.55 |
| Example 2 | 1.57 |
| Example 3 | 1.56 |
| Example 4 | 1.58 |
| Example 5 | 1.57 |
| Example 6 | 1.69 |
| Example 7 | 1.59 |
| Example 8 | 1.61 |
| Example 9 | 1.72 |

Figure 17:
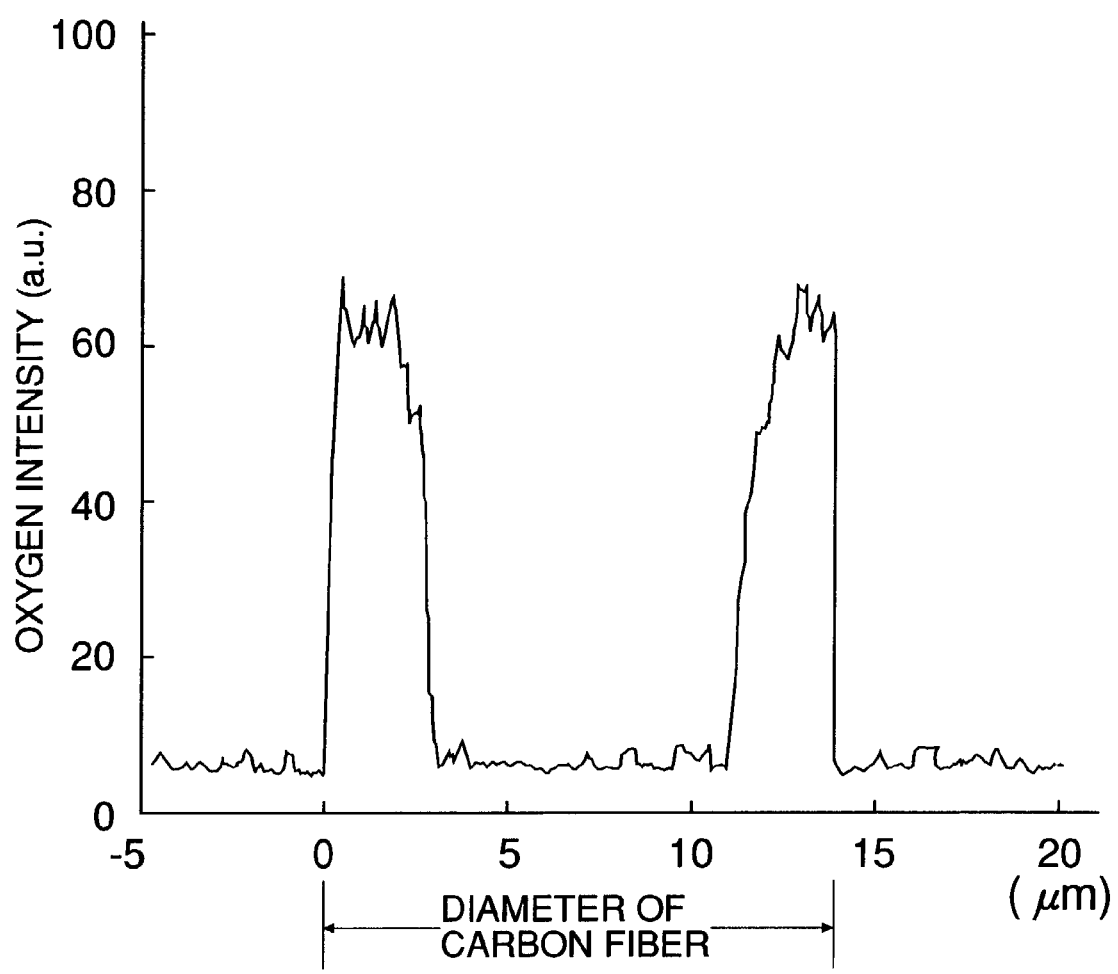
FIG. 17 is a graph showing the concentration of oxygen in one example of carbon fiber.
Figure 18:
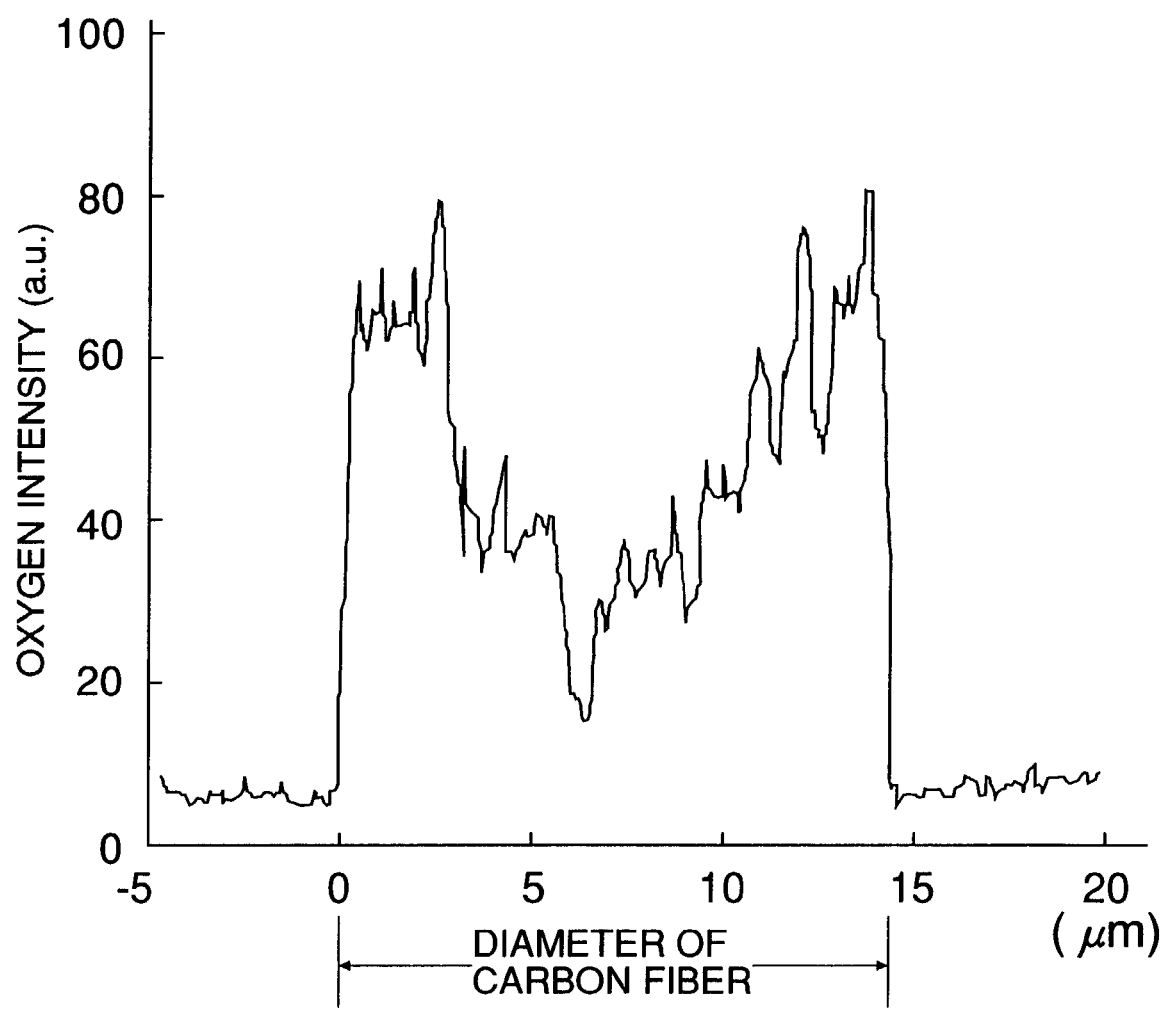
FIG. 18 is a graph showing the concentration of oxygen in another example of carbon fiber.
Figure 19:
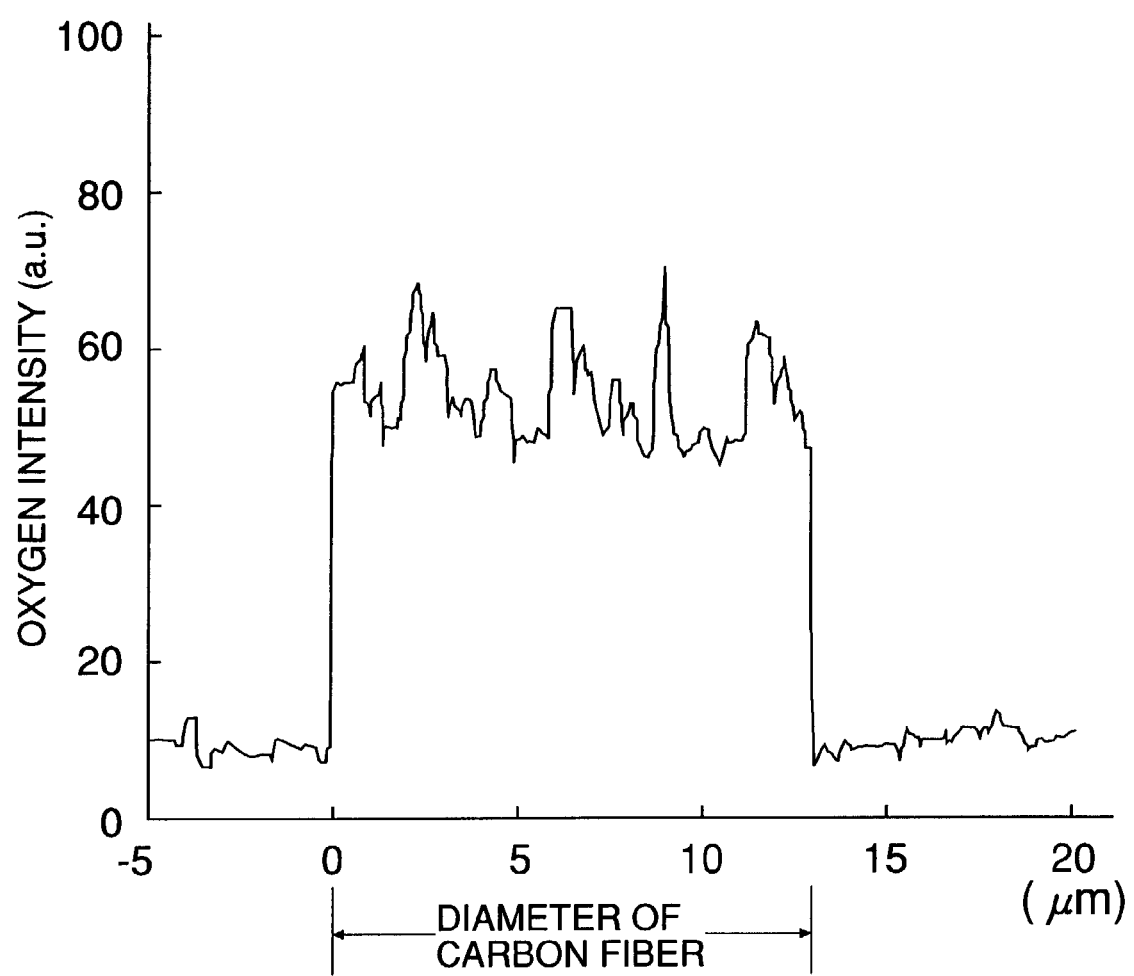
FIG. 19 is a graph showing the concentration of oxygen in a further example of carbon fiber.

A concentration of oxygen in a diametrical portion of each of the carbon fibers in each of examples 1, 6 and 9 was examined by an electron ray step scanning of TEM-EDX, thereby providing results shown in FIGS. 17 to 19.

FIG. 17 shows the result for example 1, and it can be seen from FIG. 17 that added oxygen exists only in an outer periphery of the carbon fiber and does not exist in an inner area of the carbon fiber. This existence state of the added oxygen was substantially the same as the carbon fibrils forming example 1. Example 1 corresponds to a conventional infusibilized material, as is apparent from the conditions for the oxygen-adding treatment in Table 1.

FIG. 18 shows the result for example 6, and FIG. 19 shows the result for example 9. It can be seen from these figures that added oxygen is dispersed in the entire insides of the carbon fibrils in each of examples 6 and 9. In example 6 shown in FIG. 3, the amount of added oxygen is smaller than that in example 9 shown in FIG. 4 and for this reason, the amount of oxygen added at and near the center portion is smaller than that in the outer periphery. In the case of example 9, the amount of added oxygen is large and correspondingly, the added oxygen is dispersed substantially uniformly in the carbon fiber. The dispersed state of the added oxygen in FIG. 18 was substantially the same as the carbon fibrils forming example 6, and the dispersed state of the added oxygen in FIG. 19 was substantially the same as the carbon fibrils forming the example 9. It can be said from these facts that the dispersed state of the added oxygen in each of the remaining examples was substantially the same as the carbon fibrils forming each of the examples.

3. Alkali Activating Treatment

Examples 1 to 9 of the carbon fibers were subjected to an alkali activating treatment comprising a primary stage conducted at 400° C. for 1 hour and a secondary stage conducted at 800° C. for 5 hours both in a current of nitrogen gas using KOH, thereby producing examples 1 to 9 of fibrous activated carbons corresponding to examples 1 to 9 and having an average diameter of 20 μm.

B. Fabrication of Button-Type Electric Double-Layer Capacitor (See FIG. 9)

Example 1 of the fibrous activated carbon, carbon black (a conductive filler) and PTFE (a binder) were weighed so that a weight ratio of 85.6:9.4:5 was provided. Then, the weighed materials were kneaded together and thereafter, the kneaded mixture was subjected to a rolling to fabricate an electrode sheet having a thickness of 185 μm. Two polarizing electrodes 19 and 20 having a diameter of 20 mm were cut from the electrode sheet, and a button-type electric double-layer capacitor 17 was fabricated using the two polarizing electrodes 19 and 20, a spacer 21 made of glass fiber and having a diameter of 25 mm and a thickness of 0.35 mm, a liquid electrolyte and the like. A liquid electrolyte used was a solution of 2.0 M of triethylmethyl ammonium tetrafluoroborate [$(C_2H_5)_3CH_3N.BF_4$] in propylene carbonate.

The button-type electric double-layer capacitor made using example 1 of the activated carbon as described above is called sample 1. Samples 2 to 9 of button-type electric double-layer capacitors were also fabricated in a similar manner using examples 2 to 9 of the activated carbons having a fiber length similar to that in example 1.

C. Electrostatic Capacity Density of Activated Carbon and Electric Resistance Value of Polarizing Electrode Sample 1 was subjected to a charging/discharging test which will be described below, and electrostatic capacity densities (F/g, F/cc) of example 1 of the activated carbon were determined in an energy conversion process. In the charging/discharging test, such a process was employed that the charging was conducted at 2.7 V for 90 minutes, and the discharging was conducted at 2.7 V for 90 minutes. Samples 2 to 9 were also subjected to a similar charging/discharging test, and electrostatic capacity densities of examples 2 to 9 of the activated carbons were determined.

D. Measurement of Expansion Rate of Polarizing Electrode

As shown in FIG. 15, a laminate 26 comprising two polarizing electrodes 19 and 20 using example 1 of the activated carbon, similar to those described above and a spacer 21 of a non-woven fabric having a length of 40 mm, a width of 40 mm and a thickness of 0.24 mm and interposed between the polarizing electrodes 19 and 20 was placed as sample 1 onto an internal bottom surface of a liquid bath 27 made of aluminum. A liquid electrolyte 28 similar to that described above was poured into the liquid bath 27 and then, a lower end face of a copper-made vertical portion 30 of a pressing member 29 was put on an upper surface of the upper polarizing electrode 19. Further, the vertical portion 30 and the liquid bath 27 were connected to a charging/discharging circuit 33 through connecting wires 31 and 32. In a state in which a load applied to the polarizing electrodes 19 and 20 by the pressing member 29 was set at 3 kg, the charging and discharging were conducted repeatedly at 5 mA and 2.7 V using the charging/discharging circuit 33. A total amount of polarizing electrodes 19 and 20 expanded in a thickness-wise direction during the charging was measured in terms of an amount of pressing member 29 displaced, using a laser displacement meter.

Samples 2 to 9 of laminates 28 having the polarizing electrodes 19 and 20 made using examples 2 to 9 of the activated carbon were also subjected to a similar measurement.

E. Consideration

Table 8 shows the electrode density, the electrostatic capacity density (F/g) of the activated carbon per unit weight, the electrostatic capacity density (F/cc) of the activated carbon per unit volume and the expansion rate of the polarizing electrode for samples (including the button-type electric double-layer capacitors 17 and the laminates 28) 1 to 9. This expansion rate is one for the polarizing electrode at the time when the charging was completed, i.e., when the charging voltage reached 2.7 V. For convenience, the increasing rate Y in weight of the oxygen-added material in Table 6 is also given in Table 8.

TABLE 8

| Sample | Electrode density (g/cc) | Electrostatic capacity density (F/g) | | Expansion rate of polarizing electrode (%) | Increasing rate Y in weight of oxygen-added material (%) |
|---|---|---|---|---|---|
| | | (F/g) | (F/cc) | | |
| 1 | 0.88 | 35.36 | 31.19 | 170.3 | 1.0 |
| 2 | 0.80 | 38.17 | 30.38 | 147.0 | 3.5 |
| 3 | 0.79 | 36.70 | 29.00 | 138.0 | 5.9 |
| 4 | 0.80 | 37.56 | 30.00 | 139.5 | 6.7 |
| 5 | 0.80 | 38.23 | 30.47 | 140.3 | 9.7 |
| 6 | 0.84 | 35.88 | 30.00 | 143.0 | 4.3 |
| 7 | 0.87 | 35.83 | 31.10 | 142.0 | 5.9 |
| 8 | 0.85 | 36.06 | 30.62 | 138.0 | 7.4 |
| 9 | 0.86 | 36.30 | 31.18 | 137.0 | 10.6 |

FIG. 20 is a graph taken based on Table 3 and showing the relationship between the increasing rate Y in weight of the oxygen-added material and the expansion rate of the polarizing electrode for samples 1 to 9. In FIG. 20, (1) to (9) correspond to samples 1 to 9, respectively.

As is apparent from FIG. 20, if the increasing rate Y in weight of the oxygen-added material is increased, the expansion rate of the polarizing electrode 19, 20 is decreased. In this case, if the increasing rate Y in weight of the oxygen-added material is equal to 1.0% as in sample 1, the expansion rate of the polarizing electrode 19, 20 exceeds 150%.

According to Embodiment IV, when a polarizing electrode is formed by employing a means as described above, it is possible to produce activated carbon ensuring that the amount of polarizing electrode expanded during charging can be decreased.

What is claimed is:

1. A process for producing activated carbon for an electrode of an electric double-layer capacitor, comprising the steps of:
   subjecting a starting material for activated carbon and a metal compound to a blending treatment to form a mixture,
   subjecting said mixture to an infusibilizing treatment to form an infusibilized mixture,
   subjecting said infusibilized mixture to a cooling step to form a massive mesophase pitch,
   subjecting said massive mesophase pitch to a pulverizing treatment to provide a pulverized powder,
   subjecting said pulverized powder to a carbonizing treatment to provide a carbonized powder, and
   subjecting said carbonized powder to a subsequent activating treatment.

2. A process for producing activated carbon for an electrode of an electric double-layer capacitor according to claim 1, wherein said metal compound is at least one selected from the group consisting of a chloride, an oxide and an organic metal compound, and the metal of the metal compound is at least one selected from the group consisting of Al, Ni, Fe and Co.

3. A process for producing activated carbon for an electrode of an electric double-layer capacitor according to claim 1 or 2, wherein an amount of said metal compound incorporated is set so that 0.1% by weight$\leq$J$\leq$10% by weight is established in $\{H/(G+H)\}\times 100 = J$ (% by weight), wherein G represents an amount of said starting material for activated carbon incorporated; H represents an amount of metal incorporated; and J represents an amount of metal incorporated.

* * * * *

UNITED STATES PATENT AND TRADEMARK OFFICE
CERTIFICATE OF CORRECTION

PATENT NO.       : 7,214,646 B1
APPLICATION NO.  : 10/048470
DATED            : May 8, 2007
INVENTOR(S)      : Takeshi Fujino et al.

It is certified that error appears in the above-identified patent and that said Letters Patent is hereby corrected as shown below:

Title Page -

Item (73), please delete "Kashima Oil Co., Ltd.".

Signed and Sealed this

Twenty-third Day of September, 2008

JON W. DUDAS
*Director of the United States Patent and Trademark Office*